United States Patent
Hara

(10) Patent No.: US 8,363,133 B2
(45) Date of Patent: Jan. 29, 2013

(54) SOLID-STATE IMAGE CAPTURING DEVICE AND CAMERA

(75) Inventor: Kunihiko Hara, Osaka (JP)

(73) Assignee: Panasonic Corporation, Osaka (JP)

( * ) Notice: Subject to any disclaimer, the term of this patent is extended or adjusted under 35 U.S.C. 154(b) by 140 days.

(21) Appl. No.: 12/810,080

(22) PCT Filed: Dec. 24, 2008

(86) PCT No.: PCT/JP2008/003921
§ 371 (c)(1),
(2), (4) Date: Jun. 22, 2010

(87) PCT Pub. No.: WO2009/090719
PCT Pub. Date: Jul. 23, 2009

(65) Prior Publication Data
US 2010/0271523 A1    Oct. 28, 2010

(30) Foreign Application Priority Data
Dec. 26, 2007    (JP) .................................. 2007-335389

(51) Int. Cl.
H04N 5/335    (2011.01)
(52) U.S. Cl. ........................................ 348/273; 348/280
(58) Field of Classification Search .................. 348/272, 348/273, 280, 281, 308
See application file for complete search history.

(56) References Cited

U.S. PATENT DOCUMENTS

| | | | |
|---|---|---|---|
| 4,768,085 A | 8/1988 | Hashimoto | |
| 2003/0011831 A1 | 1/2003 | Sakurai et al. | |
| 2004/0212707 A1 | 10/2004 | Itoh et al. | |
| 2005/0285958 A1 | 12/2005 | Matsuda | |
| 2007/0064129 A1 | 3/2007 | Suzuki | |
| 2007/0285548 A1 | 12/2007 | Gomi | |
| 2008/0012976 A1 | 1/2008 | Sakurai et al. | |
| 2011/0242351 A1* | 10/2011 | Shoji | 348/222.1 |
| 2011/0273598 A1* | 11/2011 | Ogino et al. | 348/272 |

FOREIGN PATENT DOCUMENTS

| | | |
|---|---|---|
| JP | 6-14752 | 2/1994 |
| JP | 2000-324397 | 11/2000 |
| JP | 2003-32548 | 1/2003 |
| JP | 2004-215048 | 7/2004 |
| JP | 2006-74367 | 3/2006 |
| JP | 2007-82063 | 3/2007 |
| JP | 2007-194892 A | 8/2007 |
| JP | 2007-228104 A | 9/2007 |
| JP | 2007-329554 A | 12/2007 |

OTHER PUBLICATIONS

Japanese Office Action of corresponding Japanese Patent Application No. 2007-335389, mail date: Jun. 26, 2012.

\* cited by examiner

*Primary Examiner* — Tuan Ho
(74) *Attorney, Agent, or Firm* — Greenblum & Bernstein, P.L.C.

(57) ABSTRACT

A solid-state image capturing device according to the present invention includes: pixel units arranged in rows and columns for outputting pixel signals corresponding to the amount of received light; and a first and a second vertical signal lines which are provided in each column of the pixel units and transmit the pixel signals. The pixel units in each of the columns are connected to the first and second vertical signal lines such that plural pixel signals of the same color are distributed among the plural vertical signal lines. The pixel signals of the same color in each of the columns may be evenly distributed among the vertical signal lines.

17 Claims, 20 Drawing Sheets

FIG. 5A
FIG. 5B
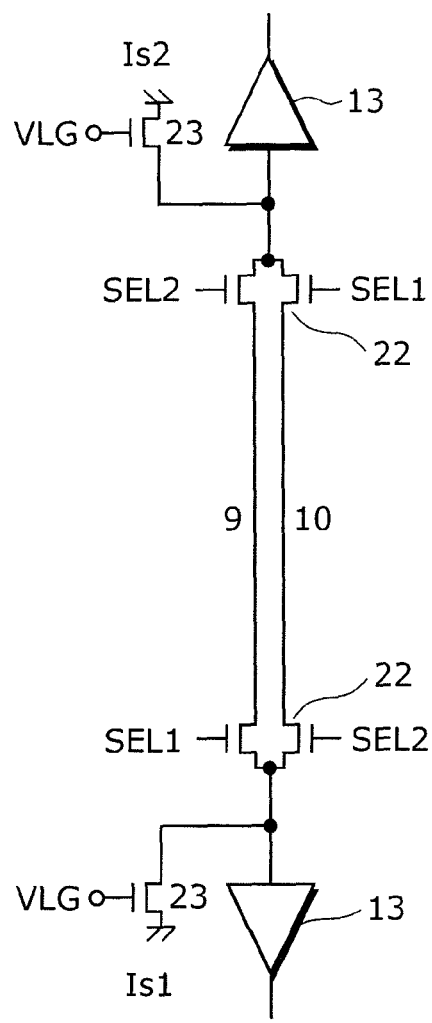
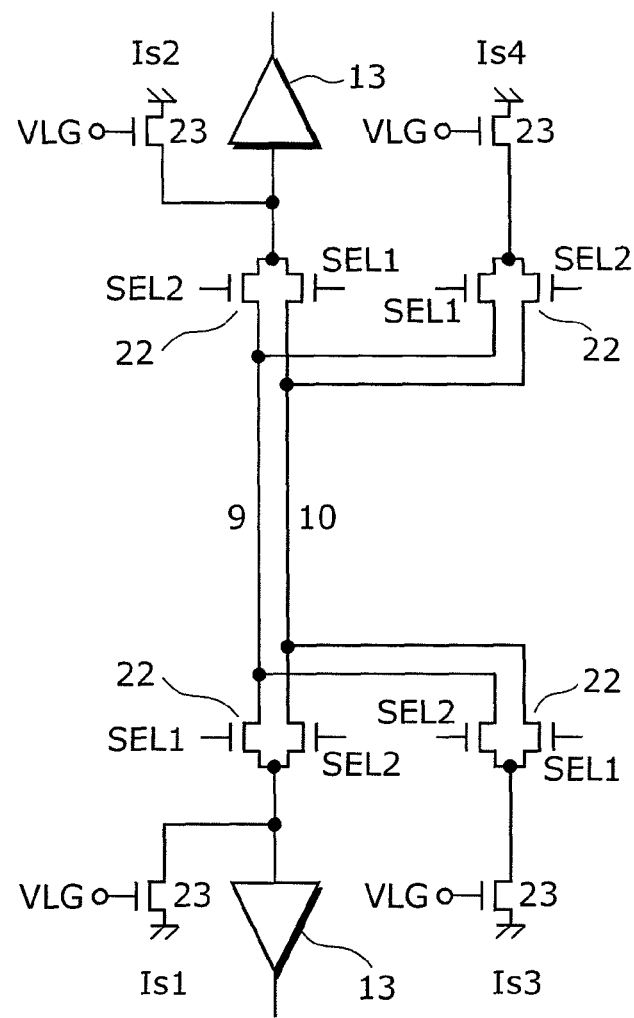

|  | 1H | 2H | 3H | 4H |
|---|---|---|---|---|
| TRANSa[0] |  |  |  |  |
| RSCEL[0] | P |  |  |  |
| RDCEL[0] | P |  |  |  |
| TRANSb[0] | P |  |  |  |
| TRANSa[2] | P |  |  |  |
| RSCEL[2] | P | P |  |  |
| RDCEL[2] | P | P |  |  |
| TRANSb[2] |  | P |  |  |
| TRANSa[4] |  | P |  |  |
| RSCEL[4] |  | P | P |  |
| RDCEL[4] |  | P | P |  |
| TRANSb[4] |  |  | P |  |
| TRANSa[6] |  |  | P |  |
| RSCEL[6] |  |  | P | P |
| RDCEL[6] |  |  | P | P |
| TRANSb[6] |  |  |  | P |
| TRANSa[6] |  |  |  | P |
| RSCEL[8] |  |  |  | P |
| RDCEL[8] |  |  |  | P |
| TRANSb[8] |  |  |  |  |
| Vertical signal line 1 | G[1] | R[4] | G[5] | R[8] |
| Vertical signal line 2 | R[2] | G[3] | R[6] | G[7] |

Gv1=33
Gv2=33
Gh1=80
Gh2=80
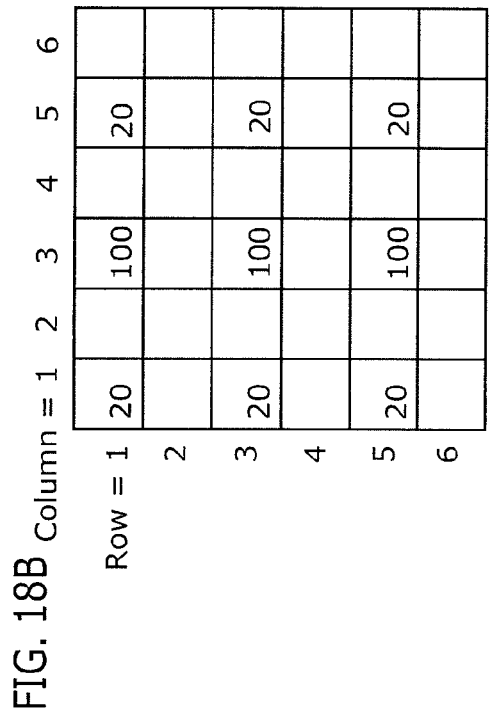
FIG. 18B
FIG. 18D
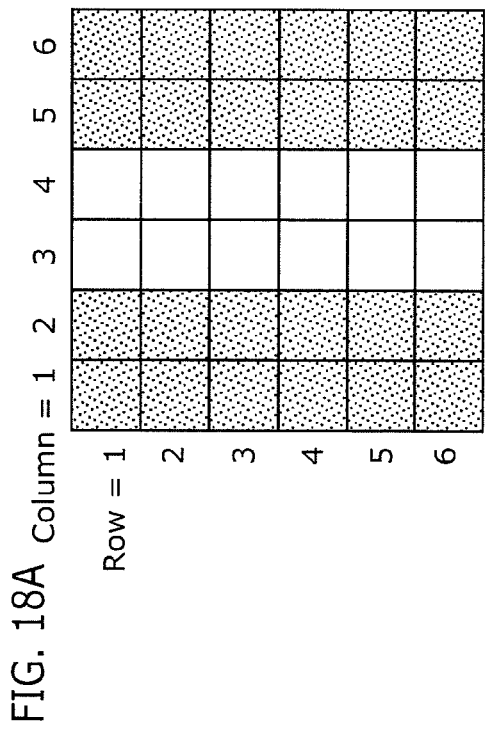
FIG. 18A
FIG. 18C

SOLID-STATE IMAGE CAPTURING DEVICE AND CAMERA

TECHNICAL FIELD

The present invention relates to a solid-state image capturing device and a camera that include unit cells which perform photoelectric conversion on incident light and which are arranged two dimensionally on a semiconductor substrate.

BACKGROUND ART

A MOS image sensor has excellent features such as high speed, low power consumption, and so on, and has recently come into use in a variety of application areas such as digital still cameras, video cameras, on-vehicle cameras, monitoring cameras, and so on.

Specifically, the MOS image sensor generally includes an imaging unit and a column circuit as shown in FIG. 2 of Patent Reference 1. In the imaging unit, unit cells that perform photoelectric conversion on incident light are arranged two dimensionally and resetting, charge accumulation, and reading are performed on a row-by-row basis. In addition, an output of unit cells in each column is connected to a vertical signal line provided in the column. Whereas, the column circuit is formed on a column-by-column basis and includes a unit which holds an analogue signal from a pixel. Each of the vertical signal lines of the imaging unit is connected to a corresponding one of the column circuits and capable of reading a pixel signal on a row-by-row basis. The pixel signals per row held in the column circuit are sequentially output to the outside of a chip by a horizontal reading circuit.

Further, Patent Reference 2 discloses a configuration of a MOS image sensor including two vertical signal lines arranged in each column for increasing reading gain of a pixel signal. Further, an output of each pixel on every other line is alternately connected to two vertical signal lines. As a result, the number of pixels connected to a single signal line is reduced, parasitic capacity decreases, and decrease in amplitude at the time of reading a pixel signal is reduced.

Patent Reference 1: Japanese Unexamined Patent Application Publication No. 2003-32548
Patent Reference 2: Japanese Unexamined Patent Application Publication No. 2000-324397

DISCLOSURE OF INVENTION

Problems that Invention is to Solve

With the configuration of the circuit according to Patent Reference 1, however, when a leakage to a ground occurs in the vertical signal line due to a manufacturing defect, for example, pixel signals of one column cannot be read. This is the same when failure occurs in the column circuit. This means that pixel signals of one column of a captured image cannot be obtained. In the case of a defective pixel on a single pixel unit, correction and restoration can be carried out by using surrounding pixel signals in a signal processing unit in a later stage, however, restoration is difficult when all of the signals of one column are lost (even when restoration is carried out, the restored portion becomes unnatural depending on an image pattern, and an image quality deteriorates).

As the number of pixels in a solid-state imaging device increases, the difficulty in eliminating the above-described defect increases, and this has become a manufacturing problem. In addition, tolerance for a failure that occurs due to deterioration with age when actually used is low as well, and thus there has been a problem that the reliability is low.

On the other hand, the circuit configuration of Patent Reference 2 has a problem that, although half pixels can be read when only one of the signal lines fails, all of the signals of the same color of one column are lost as with the prior art of Patent Reference 1 when a failure occurs in a signal line, because R and B pixels are placed in every other line in a Bayer array that is a general arrangement pattern of color filters.

It is to be noted that this problem has little effect in an application to compact digital cameras (the most prevailing type is the ½.3-inch type having approximately 11 mm of diagonal length) because the probability of defects is low when the area of a pixel unit is small. However, this becomes particularly a big problem in an application to single-lens reflex cameras because a large pixel unit area that corresponds to existing lenses is required (27 mm to 35 m in diagonal length). When it is assumed that the probability of occurring no failure in a given area is 0.95, for example, the probability of occurring no failure in an area eight times larger than the given area significantly drops to 0.66.

Thus, an object of the present invention is to provide a solid-state image capturing device in which, a failure occurring in a is vertical signal line or a column circuit does not lead to an image deterioration that is difficult to correct in a later stage.

Means to Solve the Problems

In order to solve the problems described above, a solid-state image capturing device according to an implementation of the present invention includes: pixel units which are arranged in rows and columns, each of which is configured to output a pixel signal corresponding to an amount of received light; and vertical signal lines provided in each of the columns of the pixel units and configured to transmit the pixel signals, wherein the pixel units in each of the columns are connected to the vertical signal lines such that the pixel signals of a same color are distributed among the vertical signal lines.

According to the above configuration, for example, even when a defect occurs in the vertical signal line, the number of missing pixels is reduced to 1/N of all pixel data in a single column (N is the number of vertical signal lines corresponding to the single column), and further, missing all pixel data of the same color in a single column is prevented. When not all missing pixel data is the same color, it means, in other words, pixel data of multiple colors of a corresponding vertical signal line in which defect does not occur is normal. Thus, it is possible to use pixel data of the same color in the same column in addition to pixel data of the same color in another column, for interpolation of missing pixel data. This facilitates interpolation in a later stage of the solid-state image capturing device even when a failure occurs in the vertical signal line or the column circuit, and thus produces an advantageous effect of facilitating restoration of an image.

Here, the pixel signals of the same color in each of the columns may evenly be distributed among the vertical signal lines.

According to the above configuration, for example, since immediately adjacent pixel data of the same color in the same column does not miss even when all of the pixel signals corresponding to the first vertical signal line miss, it is possible to accurately interpolate missing pixel data by using pixel data of the same color positioned immediately adjacent in the horizontal direction and pixel data of the same color positioned immediately adjacent in the vertical direction.

Here, the vertical signal lines may include a first vertical signal line and a second vertical signal line, and the pixel units of the same color belonging to each of the columns of the pixel units may be distributed between and connected to the first vertical signal line and the second vertical signal line.

Here, the vertical signal lines may include a first vertical signal line and a second vertical signal line, the pixel units of different colors are alternately connected to the first vertical signal line, and the pixel units of different colors may be alternately connected to the second vertical signal line.

According to the above configuration, even when a defect occurs in the vertical signal line, it is possible to reduce the number of missing pixels to ½ of all pixel data in a single column and to prevent that all the missing pixel data has the same color. With this, it is possible to accurately interpolate missing pixel data in the same manner as the above.

Here, each of the pixel units may include: a photoelectric conversion element which performs photoelectric conversion; a color filter which filters incident light of a corresponding color entering the photoelectric conversion element; and an output unit configured to output a signal from the photoelectric conversion element, to one of the first vertical signal line and the second vertical signal line.

Here, each of the pixel units may include: photoelectric conversion elements which include at least a first photoelectric conversion element and a second photoelectric conversion element; a first color filter which filters incident light of a corresponding color entering the first photoelectric conversion element; a second color filter which corresponds to a color different from the first color filter and filters incident light of the corresponding color entering the second photoelectric conversion element; a reading unit configured to select one of the photoelectric conversion elements and read a signal from the selected one of the photoelectric conversion elements; and an output unit configured to output the signal read by the reading unit to one of the first vertical signal line and the second vertical signal line.

According to the above configuration, a single pixel unit has two pixels adjacent in a row direction. Since two pixels share the reading unit and the output unit, it is possible to cut down a circuit area and expand an opening of the photoelectric conversion element as much as the area that has been cut down, thereby increasing sensitivity. In addition, even when a defect occurs in the vertical signal line, it is possible to prevent that missing pixels are the pixel data of the same color in a single column.

Here, the vertical signal lines may include a first vertical signal line and a second vertical signal line, and the pixel units belonging to each of the columns of the pixel units may be alternately connected to the first vertical signal line and the second vertical signal line.

According to the above configuration, it is possible to accurately interpolate missing pixel data that is missing due to defect of the vertical signal line, by using pixel data of the same color positioned immediately adjacent in the horizontal direction and pixel data of the same color positioned immediately adjacent in the vertical direction.

Here, the solid-state image capturing device may further include: a first column signal processing unit provided per column of the pixel units and configured to cancel a noise component from a pixel signal that is output from one of the pixel units via one of the first vertical signal line and the second vertical signal line; and a second column signal processing unit provided per column of the pixel units and configured to cancel a noise component from a pixel signal that is output from one of the pixel units via the other one of the first vertical signal line and the second vertical signal line.

According to the above configuration, since the first and the second column signal processing units are included, half pixel signals out of all pixel signals in a corresponding column can be output to the column signal processing unit even when one vertical signal line fails.

Here, each of the first column signal processing unit and the second column signal processing unit may include: a selector which selects one of the pixel signal from the first vertical signal line and the pixel signal from the second vertical signal line; and a canceling circuit which cancels a noise component from the pixel signal selected by the selector, and the first vertical signal line and the second vertical signal line which are connected to the selector correspond to a same column of the pixel units.

Here, each of the first column signal processing unit and the second column signal processing unit may include: a selector which selects one of the pixel signal from the first vertical signal line and the pixel signal from the second vertical signal line; and a canceling circuit which cancels a noise component from the pixel signal selected by the selector, one of the first vertical signal line and the second vertical signal line which are connected to the selector may correspond to a column of the pixel units corresponding to the selector, and the other one of the first vertical signal line and the second vertical signal line which are connected to the selector may correspond to a column of the pixel units adjacent to the column of the pixel units corresponding to the selector.

Here, the first column signal processing unit may be connected to one end of at least one of the first vertical signal line and the pixel signal and the second vertical signal line, and the second column signal processing unit may be connected to the other end of at least the other one of the first vertical signal line and the pixel signal and the second vertical signal line.

According to the above configuration, pixel signals of the first and the second vertical signal lines can be output to either the first or the second column signal processing unit. With this, it is possible to facilitate various scanning of pixel signals.

Here, each of the output units may include an amplifying transistor that amplifies a signal from the photoelectric conversion element and outputs the signal, and each of the first column signal processing unit and the second column signal processing unit may include a current source which supplies a current to one of the amplifying transistors in the pixel units belonging to a corresponding column of the pixel units.

According to the above configuration, it is possible to flexibly set the output destination of the pixel signals from each of the vertical signal lines to either the first or the second column signal processing unit, and also to obtain a uniform reading or a response speed.

Here, the solid-state image capturing device may further include: a storage unit configured to store a position of a defect pixel unit; and an interpolation unit configured to interpolate pixel data of the defect pixel unit by using pixel data of pixel units surrounding the defect pixel unit.

According to the above configuration, it is possible to accurately interpolate missing pixel data that is missing due to defect of the vertical signal line.

Here, the solid-state image capturing device may further include a detecting unit configured to detect the defect pixel unit and store, in the storage unit, the position of the defect pixel unit that has been detected.

Here, the detecting unit may identify a column in which the defect pixel unit exists by using pixel data obtained from the first vertical signal line and the second vertical signal line.

According to the above configuration, it is possible to easily detect the presence and the position of a defect pixel portion.

Effects of the Invention

With a solid-state image capturing device according to the present invention, even when a failure occurs in a single signal line or a single signal reading unit of an imaging unit, it is possible to correct and reproduce an image in signal processing in a later stage, and thus effective in facilitating manufacturing and improving reliability when actually used.

BRIEF DESCRIPTION OF DRAWINGS

FIG. 5A is a diagram which shows another configuration of a current source arrangement according to Embodiment 1 of the present invention.

FIG. 5B is a diagram which shows another configuration of the current source arrangement according to Embodiment 1 of the present invention.

FIG. 15A is a diagram which shows correction processing in the image capturing device according to Embodiment 4 of the present invention.

FIG. 15B is a diagram which shows correction processing in the image capturing device according to Embodiment 4 of the present invention.

FIG. 15C is a diagram which shows correction processing in the image capturing device according to Embodiment 4 of the present invention.

FIG. 16A is a diagram which shows correction processing in the case where there is defect in the image capturing device according to Embodiment 4 of the present invention.

FIG. 16B is a diagram which shows correction processing in the case where there is a defect in the image capturing device according to Embodiment 4 of the present invention.

FIG. 16C is a diagram which shows correction processing in the case where there is a defect in the image capturing device according to Embodiment 4 of the present invention.

FIG. 16D is a diagram which shows correction processing in the case where there is a defect in the image capturing device according to Embodiment 4 of the present invention.

FIG. 18A is a diagram which shows correction processing in the image capturing device according to Embodiment 4 of the present invention.

FIG. 18B is a diagram which shows an effect of correction processing in the image capturing device according to Embodiment 4 of the present invention.

FIG. 18C is a diagram which shows an effect of correction processing in the image capturing device according to Embodiment 4 of the present invention.

FIG. 18D is a diagram which shows an effect of correction processing in the image capturing device according to Embodiment 4 of the present invention.

Figure 1:
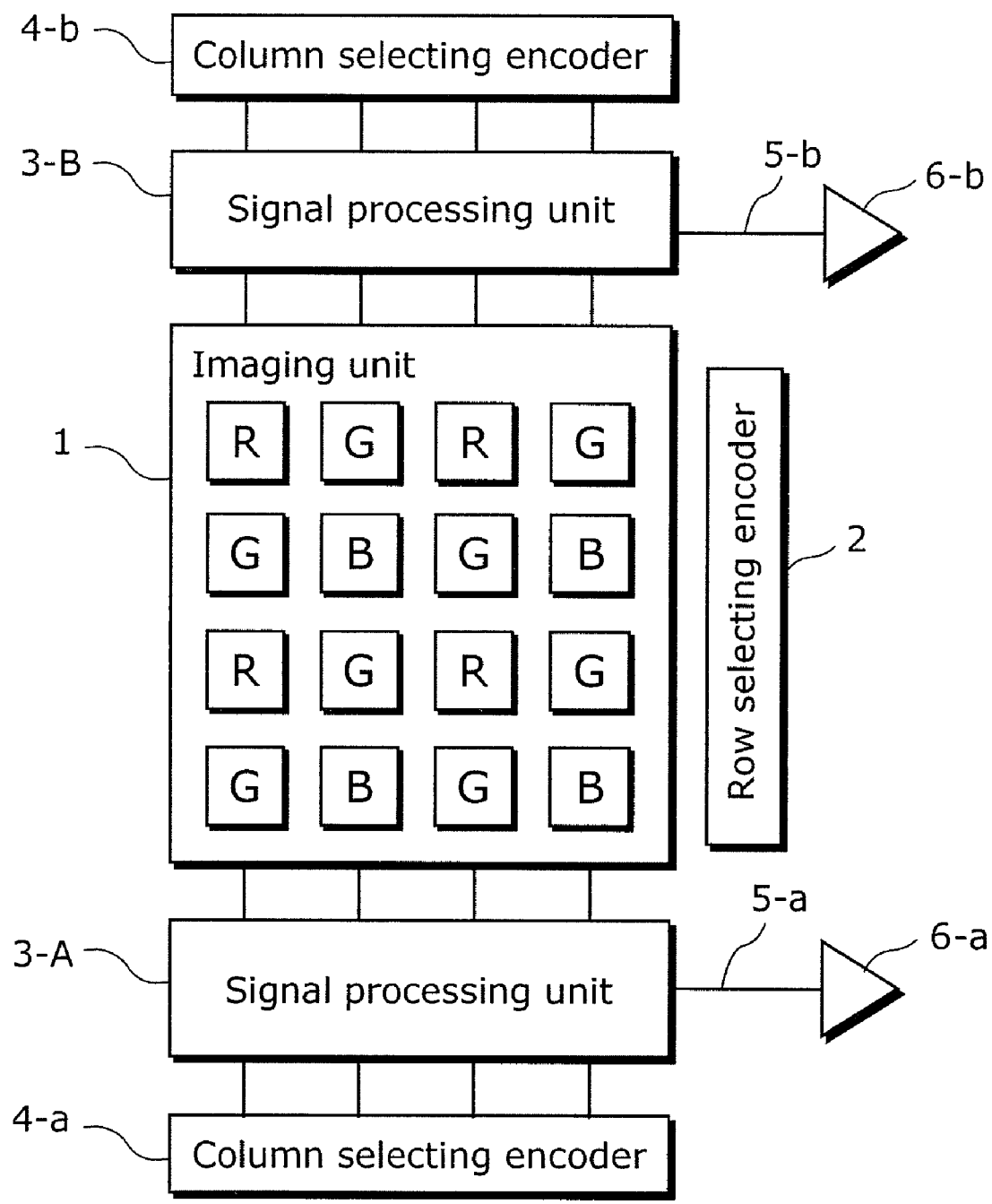
FIG. 1 is a diagram which shows an overall configuration of a solid-state image capturing device according to Embodiment 1 of the present invention.

NUMERICAL REFERENCES 1 imaging unit
2 row selecting encoder
3-A, 3-B, 300A, 300b signal processing unit
3-a, 3-b, 300a, 300b column signal processing unit
4-a, 4-b column selecting encoder
5-a, 5-b horizontal signal line
6-a, 6-b output circuit
7 R pixel
8 G pixel
9 first vertical signal line
10 second vertical signal line
11 selecting circuit
12 current source
13 column amplifier 14 noise canceling circuit
15 sample hold circuit
16, 16a, 16b photodiode (PD)
17, 17a, 17b transfer transistor
18 capacitor (floating diffusion, FD)
19 reset transistor
20 amplifying transistor
21 selecting transistor
22 vertical signal line selecting transistor
23 current source transistor
24 clamp capacity
25 clamp transistor
26 sampling capacity
27 sampling capacity inputting transistor
28 sampling capacity outputting transistor
29-A, 29-B ADC unit
29-a, 29-b column ADC unit
30-a, 30-b digital output I/F
31 solid-state image capturing device
32 AD converter
33 signal processing circuit
34 nonvolatile memory
35 failure detecting circuit
36 lens
101 pixel column

BEST MODE FOR CARRYING OUT THE INVENTION (Embodiment 1)

According to the present embodiment, a solid-state image capturing device includes: plural vertical signal lines per a single pixel column; and plural pixel units in each column connected to the vertical signal lines such that plural pixel signals of the same color are distributed among the plural vertical signal lines. The plural pixel signals of the same color in each column are evenly distributed among the plural vertical signal lines. This prevents missing all pixel data of the same color in a single column even when failure occurs in one of the vertical signal lines or one of the pixel units, thereby facilitating correction by signal processing in a later stage to reproduce an image.

The following describes, with reference to the drawings, a solid-state image capturing device and a method of driving the same according to Embodiment 1 of the present invention.

FIG. 1 is a block diagram which shows an overall configuration of the solid-state image capturing device according to Embodiment 1 of the present invention.

The solid-state image capturing device in FIG. 1 includes: an imaging unit 1; a row selecting encoder 2; two signal processing units 3-A and 3-B; two column selecting encoders 4-a and 4-b; two horizontal signal lines 5-a and 5-b; and two output circuits 6-a and 6-b. Hereinafter, the signs -a and -b are omitted when collectively describing two components having substantially the same function.

The imaging unit 1 is an imaging area in which pixels that perform photoelectric conversion are arranged two-dimensionally. An example of 16 pixels arranged in a 4×4 matrix are shown here, however, a total of at least several million pixels are actually included. Further, in order to detect a color image, each of the pixels of the imaging unit includes a color filter of one of R, G, or B which are defined as a R pixel, a G pixel, and a B pixel, respectively. The tree pixels are arranged in a Bayer array in which the G pixels are positioned in a checkered pattern.

Further, the row selecting encoder 2 includes three control lines of RDCEL, RSCEL, and TRANS for each horizontal row and controls reset (initialization), read (reading), and line select (row selecting) on unit cells in the imaging unit 1 on a row-by-row basis.

Furthermore, the signal processing unit 3 includes plural column signal processing units as a fundamental unit of processing corresponding to a column, processes an output on a row-by-row basis from the imaging unit 1, and holds a result of the processing.

Further, the column selecting encoder 4-a includes a control line and sequentially selects from column signal processing units in the signal processing unit 3.

Further, an output converting circuit 6 receives an output from the signal processing unit 3 via the horizontal signal line 5, performs conversion necessary for outputting to the outside, such as signal amplification and AD conversion, and then outputs.

Further, the signal processing unit, the column selecting encoder, the horizontal signal line, and the output circuit are placed both above and below the imaging unit. The signals detected in the imaging unit are distributed between the upper and the lower circuit and read to the outside of the chip.

Figure 2:
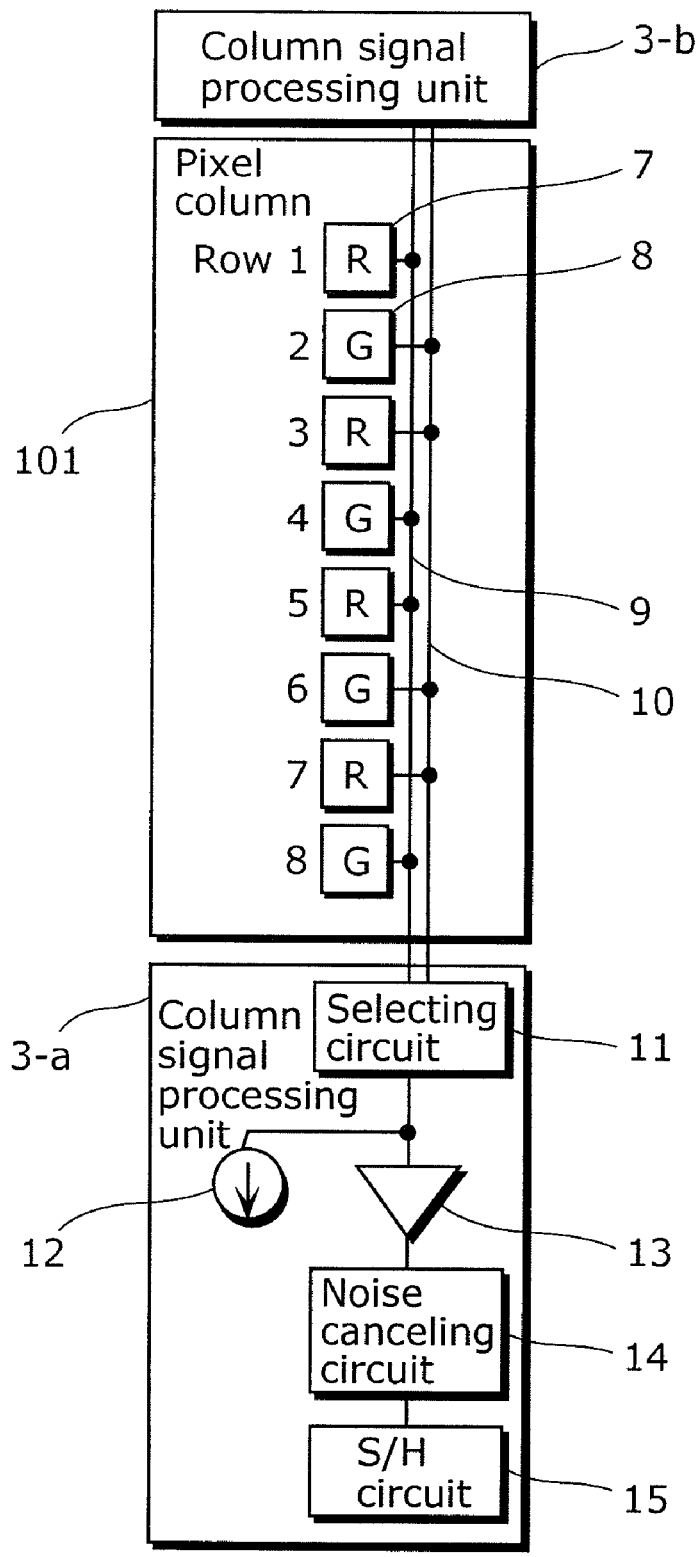
FIG. 2 is a diagram which shows a configuration of a single column of the solid-state image capturing device according to Embodiment 1 of the present invention.

FIG. 2 is a configuration diagram focused on one column of the imaging unit and the column signal processing unit in the solid-state image capturing device as shown in FIG. 1. In this diagram, a pixel column 101, and a column signal processing units 3-a and 3-b are shown as a configuration corresponding to one pixel column in the solid-state image capturing device. A first vertical signal line 9 and a second vertical signal line 10 are provided, each of which corresponds to the pixel column 101.

The column shown in FIG. 2 includes R pixels, in which R pixels 7 and G pixels 8 are placed alternately. Further, two vertical signal lines, that is, the first vertical signal line 9 and the second vertical signal line 10 are provided. The R pixels in the row 1 and the row 5 are connected to the first vertical signal line 9, and the R pixels in the row 3 and the row 7 are connected to the second vertical signal line 10, whereas the G pixels in the row 2 and the row 6 are connected to the second vertical signal line 10, and the G pixels in the row 4 and the row 8 are connected to the first vertical signal line 9. As described above, the pixels of the same color in one column are alternately connected to the first vertical signal line 9 or the second vertical signal line 10 in FIG. 2. Further, the pixel units of different colors are alternately connected to the first vertical signal line 9 and the pixel units of different colors are alternately connected to the second vertical signal line 10.

Further, the column signal processing unit 3 includes: a selecting circuit 11 which selectively receives an input of a signal of two vertical signal lines; a current source 12 used for reading a pixel signal; a column amplifier 13 which amplifies the pixel signal; a noise canceling circuit 14 which corrects characteristic unevenness of a pixel and reduces a noise of an image; and a sample hold circuit 15 which temporarily holds an output of the noise canceling circuit 14.

Figure 3:
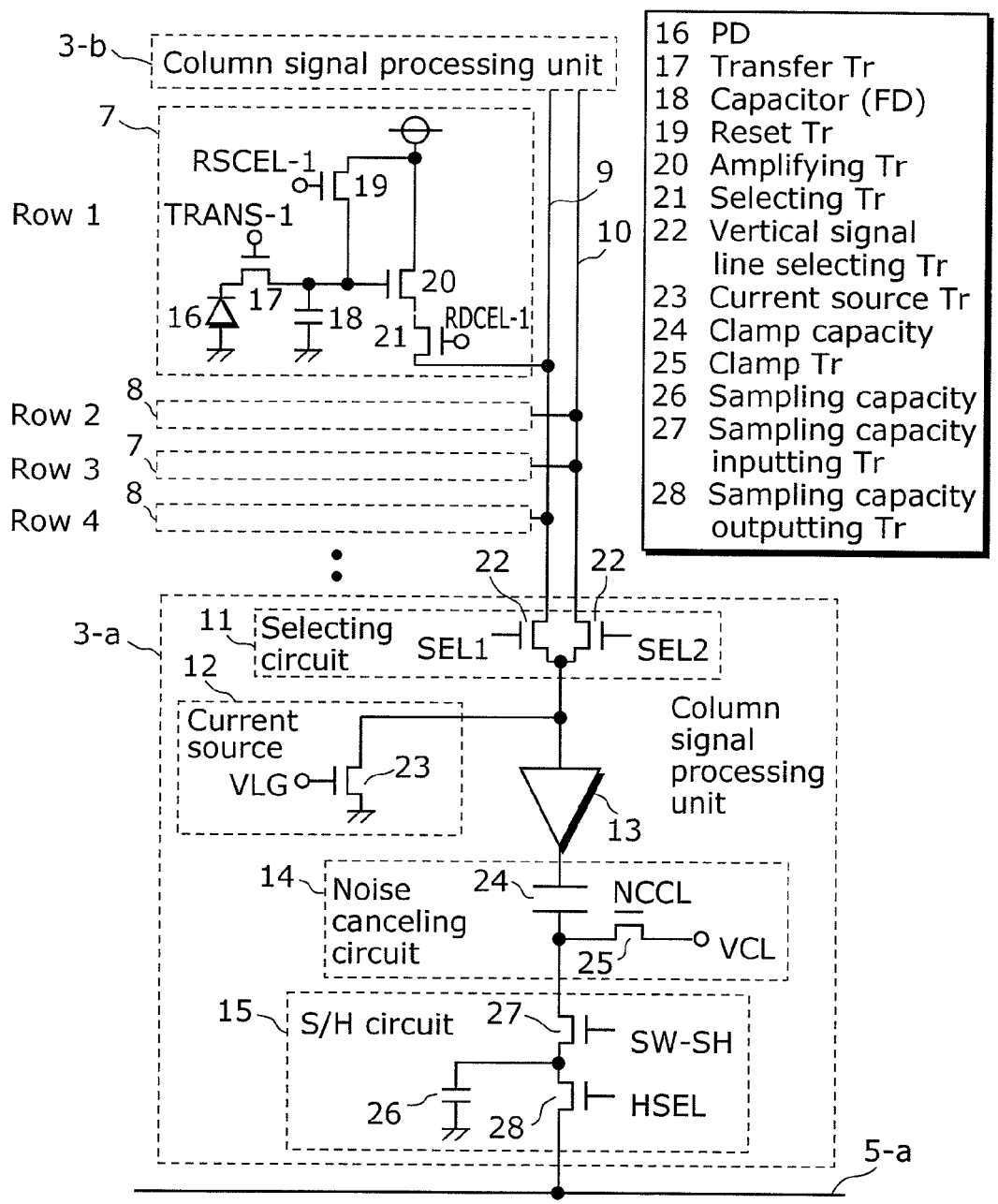
FIG. 3 is a circuit diagram of the solid-state image capturing device according to Embodiment 1 of the present invention.

FIG. 3 is a circuit diagram which shows details of the pixels of the imaging unit and the column signal processing unit. It is to be noted that, although only the R pixels are shown in the configuration of the pixel circuit in FIG. 3, the G pixels are the same as well.

As shown in FIG. 3, the pixel circuit outputs: a reset voltage obtained by amplifying a voltage at the time of initialization; and a read voltage obtained by amplifying a voltage at the time of reading, and includes: a photodiode (PD) 16 which performs photoelectric conversion on incident light and outputs an electric charge; a capacitor (floating diffusion, FD) 18 which accumulates the electric charge generated by the PD 16 and outputs the accumulated electric charge as a voltage signal; a reset Tr 19 which resets the voltage indicated by the capacitor 18 such that the voltage becomes a initial voltage (here, VDD); a transfer Tr 17 which supplies the electric charge output from the PD 16 to the capacitor 18; an amplifying Tr 20 which outputs a voltage that changes according to the voltage indicated by the capacitor 18; and a selecting Tr 21 which connects the output from the amplifying Tr 20 to the vertical signal line when receiving a line selecting signal from the row selecting encoder.

Further, the signal processing unit 3 temporarily holds a signal which indicates a difference between the reset voltage and the read voltage which are provided from the pixel circuit and outputs the signal to the horizontal signal line 5, and includes two vertical signal line selecting Trs 22 which are placed in the selecting circuit 11 and which selectively receive an input of the signal of two vertical signal lines.

Furthermore, the signal processing unit 3 includes: a current source Tr23 to which a bias voltage VLG is supplied; a column amplifier 13 which amplifies the pixel signal that has been input via the first vertical signal line 9 or 10 and the vertical signal line selecting Tr 22; a clamp capacity 24 which receives an output from the column amplifier 13 and obtains a difference between the resetting signal and the read signal, that is, brightness information; a clamp Tr 25 for setting a terminal potential opposite to the column amplifier 13 of the clamp capacity 24 as a clamp potential VCL; a sampling capacity 26 which temporarily holds the brightness information; a sampling capacity inputting Tr 27 which inputs a signal into the sampling capacity 26; and a sampling capacity outputting Tr 28 which outputs the signal held in the sampling capacity 26 to a horizontal signal line.

Here, a reset pulse (initialization signal: RSCEL), a read pulse (reading pulse: TRANS), and a line select pulse (row selecting signal: RDCEL) are supplied to the pixel circuit with a predetermined timing, a vertical signal line selecting pulses 1 and 2 (SEL1, SEL2), a sampling pulse (SW-SH), and a clamp pulse (NCCL) are supplied to the column signal processing unit 3 with a predetermined timing, and transistors respectively correspond to control pulses are turned on and off.

As described above with reference to FIG. 1 to FIG. 3, the solid-state image capturing device according to Embodiment 1 of the present invention includes two vertical signal lines in each column of the pixel unit, and a part of the pixels of the respective colors in each column are connected to one of the vertical signal line and the rest of the pixels are connected to the other vertical signal line, thereby allowing half of the pixels of the respective colors in each column to retain a reading path even when one of the vertical signal lines fails.

Figure 4A:
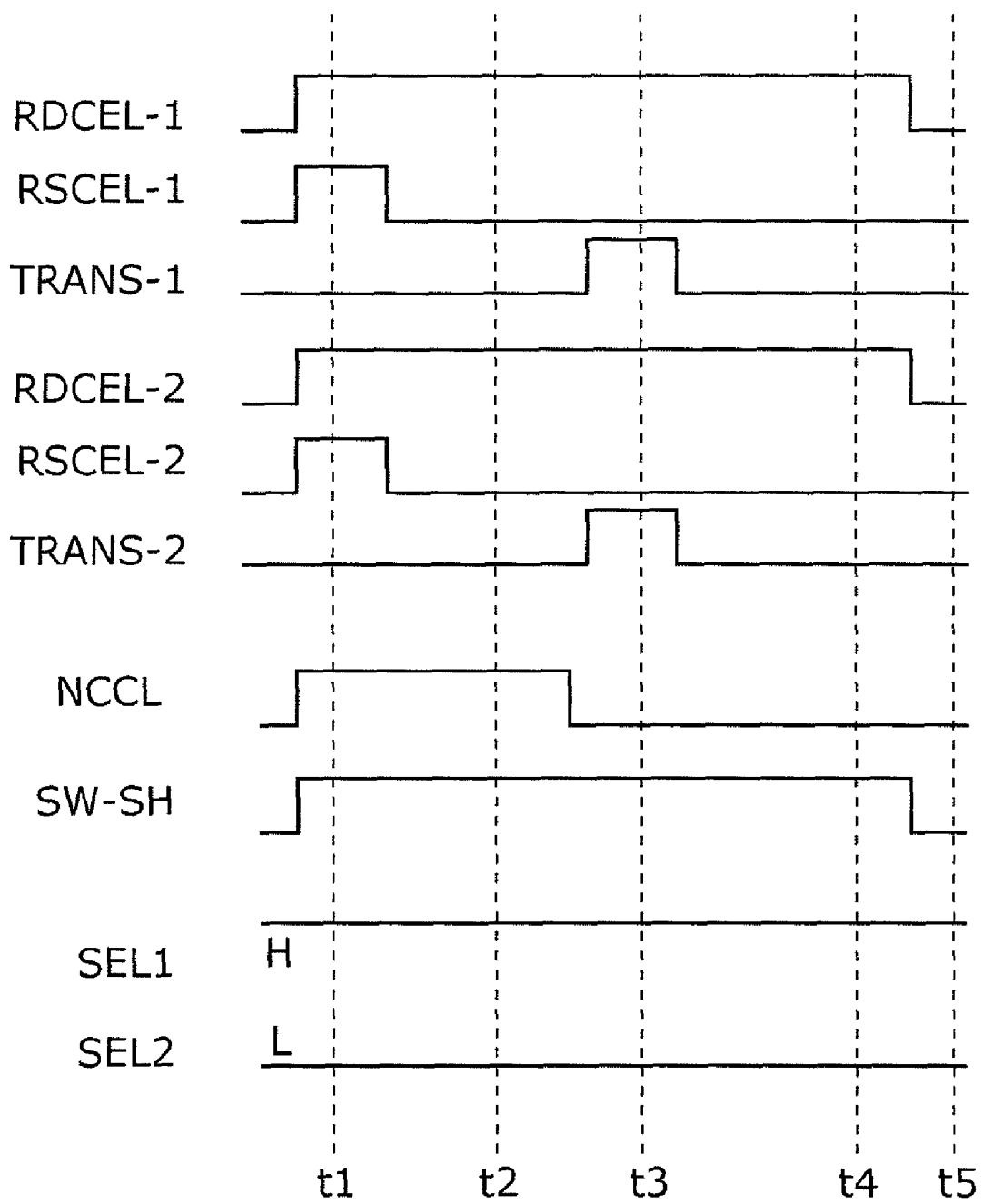
FIG. 4A is a diagram which shows a timing of each control pulse of the solid-state image capturing device according to Embodiment 1 of the present invention.
Figure 4B:
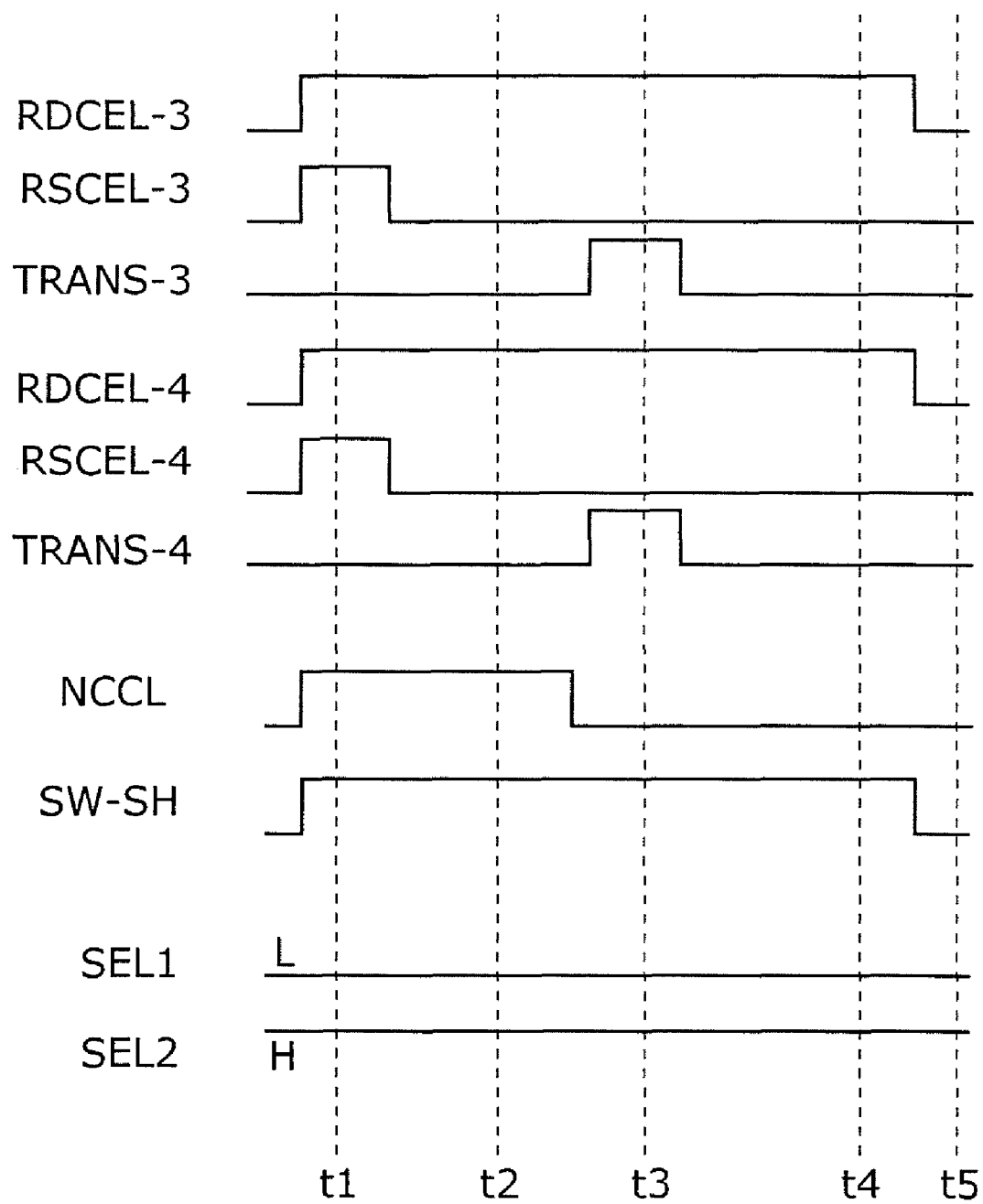
FIG. 4B is a diagram which shows a timing of each control pulse of the solid-state image capturing device according to Embodiment 1 of the present invention.

The following describes a method of driving the solid-state image capturing device according to Embodiment 1 of the present invention with reference to FIG. 4A and FIG. 4B.

FIG. 4A shows: the RDCEL-1 and RDCEL-2 that are pulse voltages for performing a connection operation of a pixel output of the rows 1 and 2 to the vertical signal lines; the RSCEL-1 and RSCEL-2 that are pulse voltages for performing a reset operation of the capacitor to an initial voltage at pixels in the rows 1 and 2; the TRANS-1 and TRANS-2 that are pulse voltages for performing a transfer operation of electric charges accumulated in the PD of the pixels in the rows 1 and 2; the NCCL is a pulse voltage for setting a terminal potential opposite to the column amplifier of the clamp capacity to a clamp potential VCL; the SW-SH is a pulse voltage for writing a signal on the sampling capacity; the SEL 1 is a voltage for performing a connection operation of the first vertical signal line to the lower column signal processing unit 3; and the SEL 2 is a voltage for performing a connection operation of the second vertical signal line to the lower column signal processing unit 3.

FIG. 4B shows: the RDCEL-3 and RDCEL-4 that are pulse voltages for performing a connection operation of pixel output of the rows 3 and 4 to the vertical signal lines; the RSCEL-3 and RSCEL-4 that are pulse voltages for performing a reset operation of the capacitor to an initial voltage at pixels in the rows 3 and 4; and the TRANS-3 and TRANS-4 that are pulse voltages for performing a transfer operation of electric charges accumulated in the PD of the pixels in the rows 3 and 4.

First, FIG. 4A is a diagram which shows a timing of each control pulse supplied at the time of reading the row 1 and the row 2 in the solid-state image capturing device as shown in FIG. 3. Here, the reading operation of the R pixel is described in detail.

Since the SEL 1 is H and the SEL 2 is L, a signal of the R pixel in the row 1 is read via the first vertical signal line 9 and the lower column signal processing unit 3, and a signal of the G pixel in the row 2 is read via the second vertical signal line 10 and the upper column signal processing unit 3.

First, the transfer Tr is off and the reset Tr is on at a timing t1, and a potential of the capacitor (hereinafter referred to as Vfd) is initialized to a FD reset potential Vfdrst (=VDD).

Next, the transfer Tr and the reset Tr are off at a timing t2, and thus the reset status of the FD potential is retained. At this time, since the selecting Tr is on, the amplifying Tr 20 and the current source 12 compose a source follower circuit and a Vfdrst-Vth is output to the first vertical signal line 9 as a reset voltage (it is a Vfdrst-Vth-α to be exact, however, α is omitted here). Further, the reset voltage Vfdrst-Vth is input into the column amplifier via the vertical signal line selecting Tr, and the column amplifier outputs a voltage corresponding to the Vfdrst-Vth to one of the terminals of the clamp capacity. On the other hand, the other terminal of the clamp capacity and the potential of the sampling capacity are fixed to the VCL as the clamp Tr is on.

Next, the transfer Tr is on at a timing t3, and thus the electric charges accumulated in the PD are transferred to the capacitor and the Vfd decreases by the voltage Vfdsig corresponding to the amount of the signal electric charges to become the Vfdrst-Vfdsi.

Next, the transfer Tr is off and the selecting Tr is on at a timing t4, and the Vfdrst-Vfdsig-Vth is output to the first vertical signal line 9 as a read voltage. With this, since the input of the column amplifier changes by Vfdsig, when the gain of the column amplifier is A, the output increases by Vfdsig×A (the column amplifier is assumed to be an inverted type). Further, since the clamp Tr is off, the potential of the other terminal of the clamp capacity, that is, the potential of the sampling capacity increases by Vfdsig×A×Ccl/(Ccl+Csh). Here, the Ccl represents the capacity value of the clamp capacity and the Csh represents the capacity value of the sampling capacity. This potential change is a voltage corresponding to the difference between the reset voltage and the read voltage of the vertical signal line, that is, brightness information of the R pixel in the row 1, which becomes SW-SH=I at a timing t5 at the end, and the brightness information is written into the sampling capacity of the lower column signal processing unit 3. A signal of the G pixel in the row 2 is read in the same manner at the timings t1 to t5, and the brightness information of the G pixel is held in the sampling capacity of the upper column signal processing unit 3

After reading of two rows, that is, the rows 1 and 2, from the imaging unit to the sampling capacity is completed through the timings t1 to t5 as described above, the R brightness information held in the lower sampling capacity is sequentially selected by the column selecting encoder and read as an analogue signal to the outside of the chip via the horizontal signal line 5-a and the output circuit 6-a, as shown in FIG. 1 and FIG. 2.

Likewise, the G brightness information held in the upper sampling capacity is sequentially output to the outside of the sensor via the horizontal signal line 5-b and the output circuit 6-b.

Next, FIG. 4B is a diagram which shows a timing of each control pulse supplied at the timing of reading the row 3 and the row 4 in the solid-state imaging device shown in FIG. 3. Since the SEL 1 is L and the SEL 2 is H, a signal of the R pixel in the row 3 is read via the second vertical signal line 10, the lower column signal processing unit 3, and the output circuit, and a signal of the G pixel in the row 4 is read via the first vertical signal line 9, the upper column signal processing unit 3, and the output circuit.

Thus, the brightness information of the entire imaging unit can be read by alternately repeating the operations of FIG. 4A and FIG. 4B, and the R pixel signals in the rows 1, 5, 9, . . . can be read via the first vertical signal line 9 and R pixel signals in the rows 3, 7, 11, . . . can can be read via the second vertical signal line 10.

As described above with reference to FIG. 1 to FIG. 4, the solid-state image capturing device according to Embodiment 1 of the present invention includes two vertical signal lines in each column of the pixel unit, pixels of the respective colors in each of the columns are distributed between and connected to the two vertical signal lines, and even when a failure occurs in one of the vertical signal lines, a signal of the pixel connected to the other vertical signal line can be read, by reading a part of the signal of the pixel of the respective colors in each of the columns via the one of the vertical signal line and others via the other vertical signal line.

Thus, it is possible to prevent the problem of losing all of the signals of one of the colors in one column when a failure occurs in the signal line even when using the Bayer array that is a general arrangement pattern of color filters.

Further, in the solid-state image capturing device according to Embodiment 1 of the present invention, since the R pixels having brightness information of each column are distributed between and read into the two vertical signal lines, it is possible to read half of the R pixel brightness information of each column even when a failure occurs in one of the vertical signal lines, or disconnecting occurs, for example. It is to be noted that the same advantageous effect can be obtained as to the B pixels and the G pixels.

It is to be noted that two vertical signal lines are provided in each column of the pixel unit according to an implementation of the present invention. Although a case may be considered in which this leads to a drawback when reducing a pixel size for the purpose of a higher pixel density, this does not become a practical problem in view of the particularity of the pixel design.

To be specific, as to the problems of the size of devices in a pixel (the FD, the amplifying Tr, and the like) and the size of a wiring area when reducing a pixel size, both of the width and space of the wiring becomes reduced as time passes by applying a leading-edge process for a system LSI (reduced by approximately 30% in a year and half according to Moore's law, for reference). On the other hand, the size of devices cannot be reduced at the same pace as miniaturization of the process for a system LSI for the reason that the FD cannot be rapidly reduced for securing the number of saturated electrons, the gate area of the amplifying Tr cannot be the smallest size for addressing 1/F noise, and so on. This means that the restriction on reducing the pixel size is not in the wiring but is in the devices, and thus the two vertical signal lines according to an implementation of the present invention are not the subject of restriction on miniaturization.

Figure 5C:
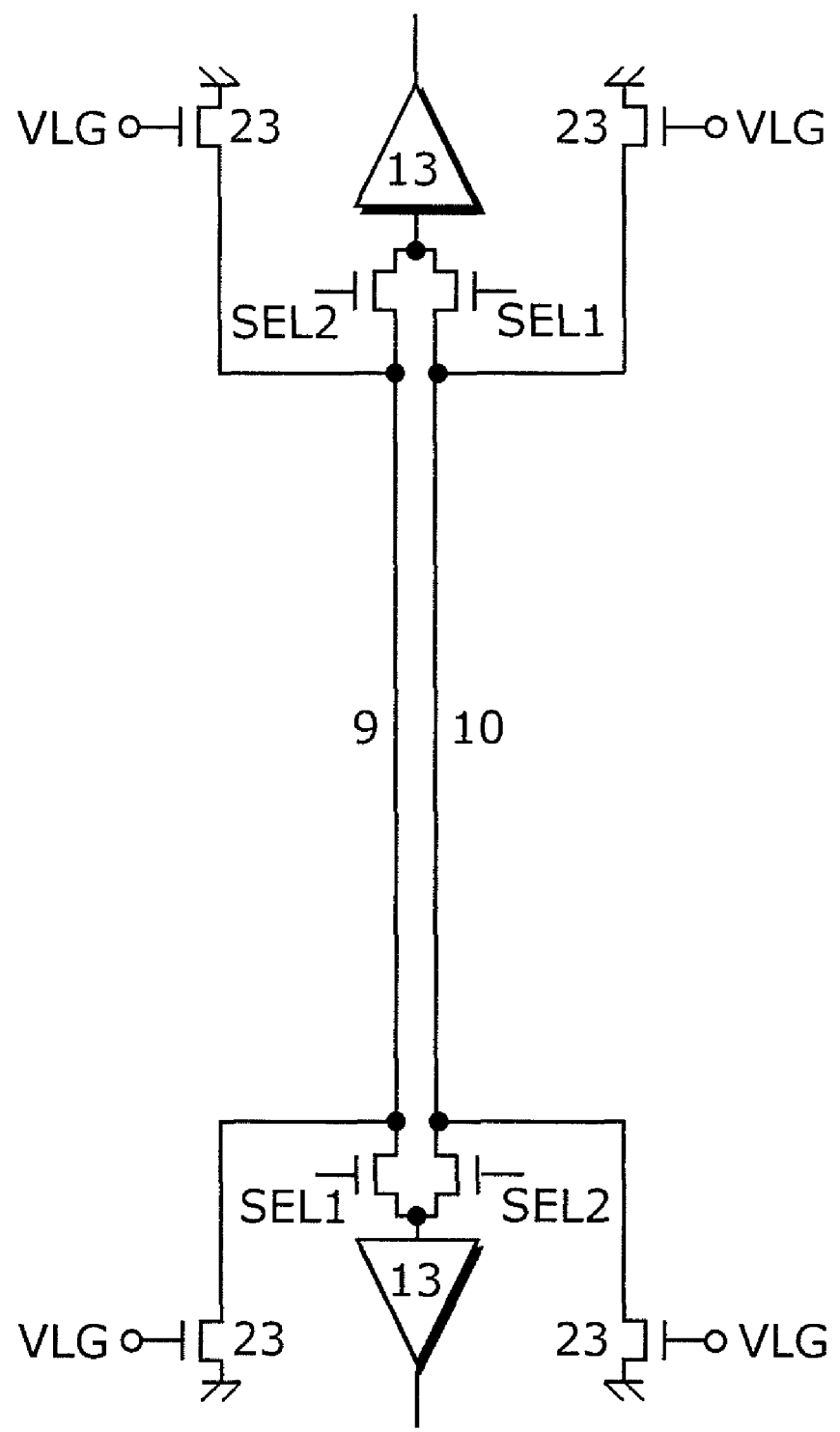
FIG. 5C is a diagram which shows another configuration of the current source arrangement according to Embodiment 1 of the present invention.

Here, FIG. 5A, FIG. 5B, and FIG. 5C show three examples of arranging the current source which can be applied to the solid-state image capturing device according to Embodiment 1 of the present invention. The diagrams show only the vertical signal line, the current source, and the column amplifier.

FIG. 5A has the same configuration as in FIG. 3, and two current sources are provided for each column. In the case of reading to the lower side, the same current source Is1 is used via either one of vertical signal lines. Likewise, in the case of reading to the upper side, the same current source Is2 is used when using either one of vertical signal lines. The R, G, and B pixel signals in each column are read by using the same current source, which means more uniform reading is possible, and thus it is advantageous for improving an image quality.

Four current sources are provided in each column in FIG. 5B. In the case of reading to the lower side, the same current sources Is1 and Is4 are used when using either one of vertical signal lines. In the case of reading to the upper side, the same current sources Is2 and Is3 are used. The R, G, and B pixel signals in each column are read by using the same current sources in the same manner as in FIG. 5A. Further, since the current sources are placed at both sides of the vertical signal lines, there also is an advantage that a uniform reading response speed can be obtained from the top to the bottom of the imaging unit even when the number of pixels in the imaging unit becomes enormous and parasitic components in the vertical signal lines increases.

Four current sources are provided in each column in FIG. 5C. The same uniformity as in FIG. 5B is obtained as to the reading response, and there also is an advantage that the circuit configuration becomes simple.

(First Modification of Embodiment 1)

The following describes a solid-state image capturing device and a method of driving the same according to the first modification of Embodiment 1 of the present invention with reference to the drawings. It is to be noted that the overall configuration of the solid-state image capturing device is the same as in FIG. 1.

Figure 6:
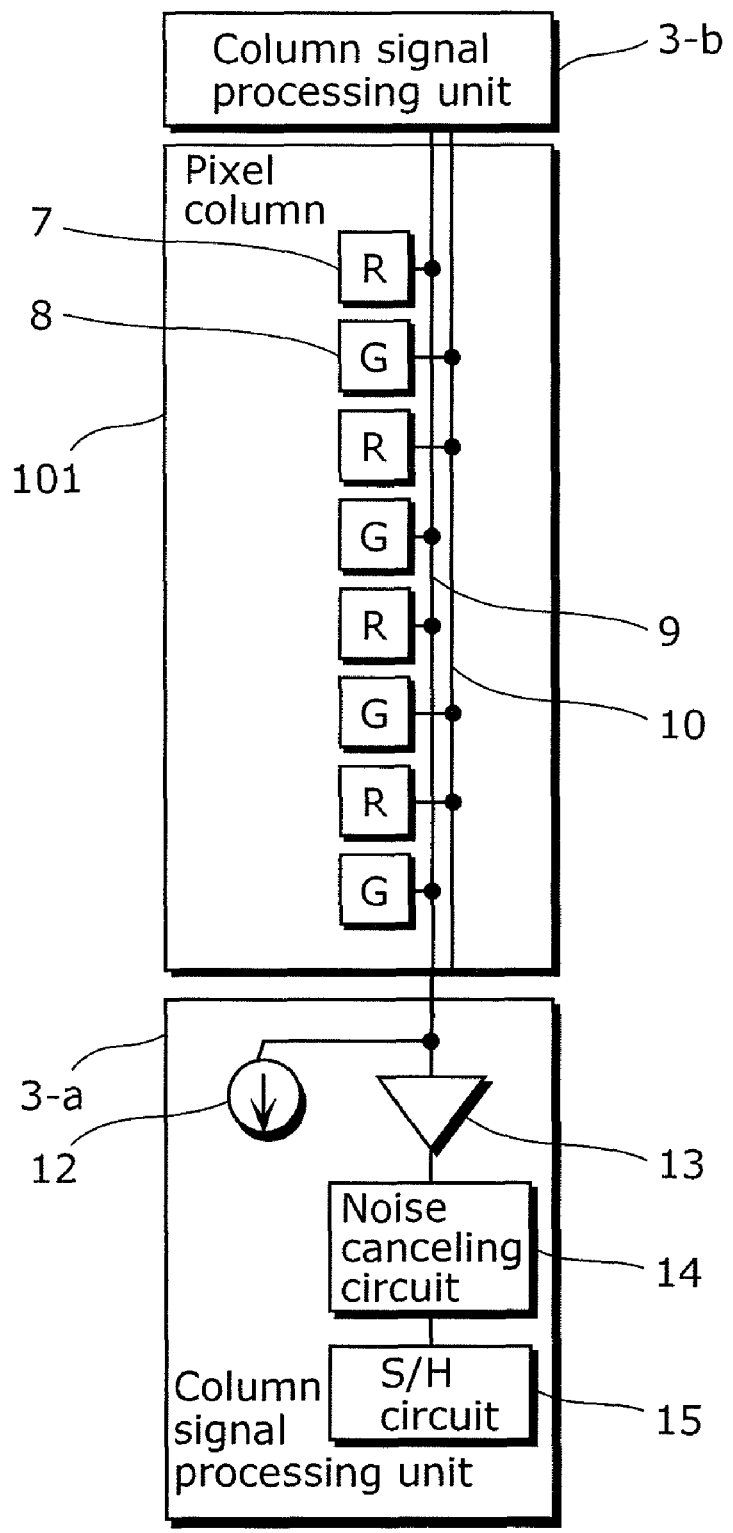
FIG. 6 is a diagram which shows a configuration for a single column of the solid-state image capturing device according to a first modification of Embodiment 1 of the present invention.

FIG. 6 is a configuration diagram focusing on one column of an imaging unit and a column signal processing unit in a solid-state image capturing device according to the first modification of Embodiment 1 of the present invention.

FIG. 6 shows a column including R pixels, in which R pixels 7 and G pixels 8 are placed alternately. Further, two vertical signal lines, that is, the first vertical signal line 9 and the second vertical signal line 10 are provided. The R pixels in the row 1 and the row 5 are connected to the first vertical signal line 9, and the pixels in the row 3 and the row 7 are connected to the second vertical signal line 10, whereas the G pixels in the row 2 and the row 6 are connected to the second vertical signal line 10, and the pixels in the row 4 and the row 8 are connected to the first vertical signal line 9.

The column signal processing unit 3 includes: a current source 12 used for reading a pixel signal; a column amplifier 13 which amplifies the pixel signal; a noise canceling circuit 14 which corrects characteristic unevenness of a pixel and reduces a noise of an image; and a sample hold circuit 15 which temporarily holds an output of the noise canceling circuit.

A first vertical signal line is connected to a lower column signal processing unit 3 and a second vertical signal line is connected to an upper column signal processing unit 3.

Next, reading of a pixel signal is described with reference to FIG. 6. First, brightness information of an R pixel in the row 1 and a G pixel in the row 2 is read. The information of the R pixel in the row 1 passes through the first vertical signal line 9 and is held in a sampling capacity of the lower signal processing unit 3, and the information of the G pixel in the row 2 passes through the second vertical signal line 10 and is held in a sampling capacity of the upper signal processing unit 3. Next, brightness information of the R pixel in the row 3 and the G pixel in the row 4 is read. The information of the R pixel in the row 3 passes through the second vertical signal line 10 and is held in a sampling capacity of the upper signal processing unit 3, and the information of the G pixel in the row 4 passes through the first vertical signal line 9 and is held in a sampling capacity of the lower signal processing unit 3. The pixel signals of the entire imaging unit are read by alternately repeating the two operations.

As described above with reference to FIG. 6, the solid-state image capturing device according to the first modification of the Embodiment 1 of the present invention includes two vertical signal lines in each column of the pixel unit, pixels of the respective colors in each of the columns are distributed between and connected to the two vertical signal lines, and one of the vertical signal lines is connected to the lower column signal processing unit 3 and the other vertical signal line is connected to the upper column signal processing unit 3, and even when a failure occurs in one of the vertical signal lines or column signal processing units 3, half of the R pixel brightness information in each of the columns can be read. It is to be noted that the same advantageous effect can be obtained as to the B pixels and the G pixels.

(Second Modification of Embodiment 1)

The following describes a solid-state image capturing device and a method of driving the same according to the second modification of Embodiment 2 of the present invention with reference to the drawings.

Figure 7:
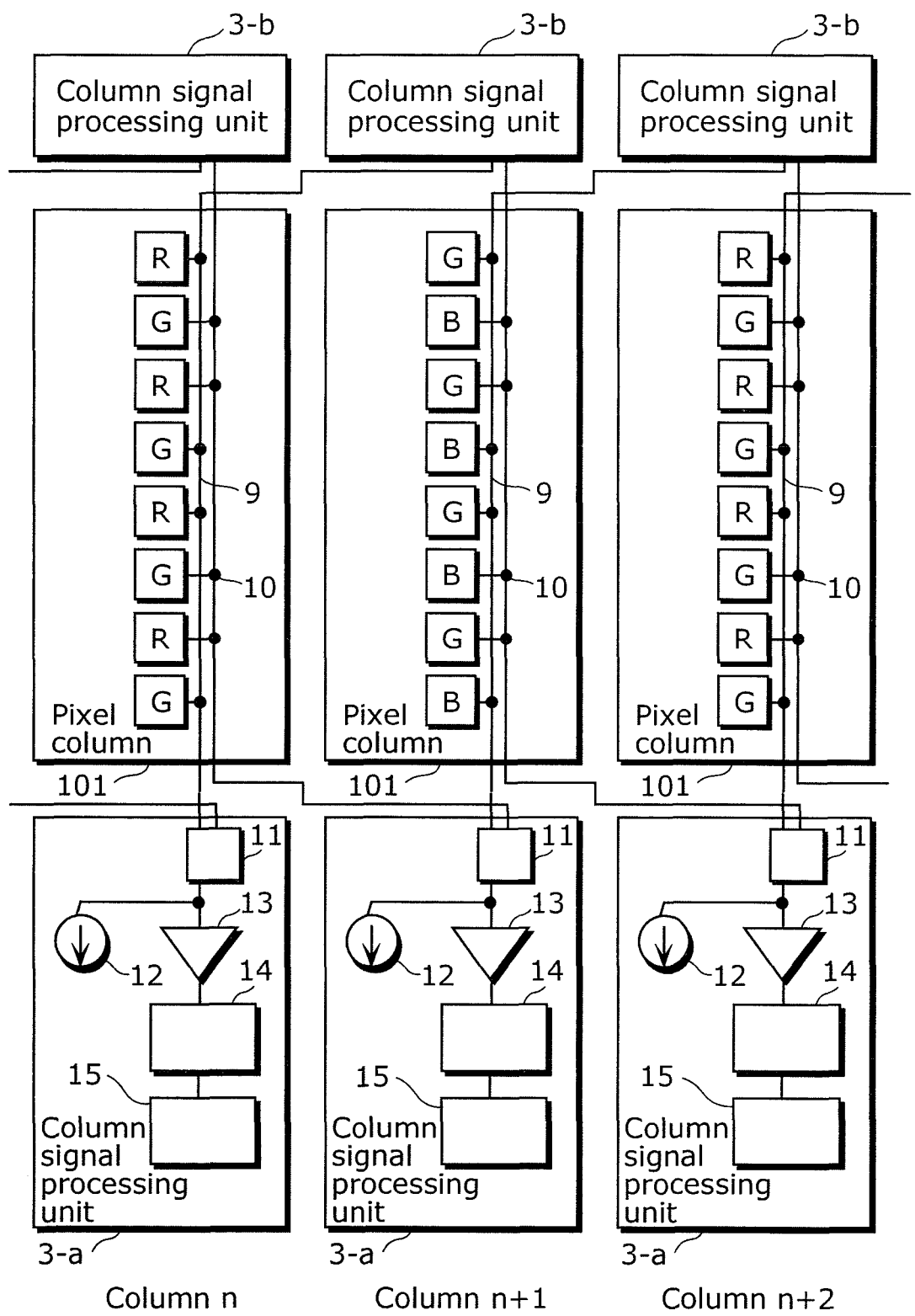
FIG. 7 is a diagram which shows a configuration of three columns of the solid-state image capturing device according to a second modification 2 of Embodiment 1 of the present invention.

FIG. 7 is a circuit diagram which shows a configuration of three columns of a solid-state image capturing device according to the second modification of Embodiment 1 of the present invention. It is to be noted that component parts are the same as those in Embodiment 1 as shown in FIG. 2. The difference is connection between the vertical signal line and the column signal processing unit 3. Further, the first vertical signal line 9 in a column n is connected to a lower signal processing unit 3 in the column n and an upper signal processing unit 3 in the column n+1, and the second vertical signal line 10 is connected to a lower signal processing unit 3 in a column n+1 and an upper signal processing unit 3 in the column n. It is to be noted that the overall configuration of the solid-state image capturing device is the same as in FIG. 1.

The following describes reading of pixel signals focusing on the column n in FIG. 7.

First, brightness information of an R pixel in the row 1 and a G pixel in the row 2 is read. The information of the R pixel in the row 1 passes through the first vertical signal line 9 and is held in a sampling capacity of the lower column signal processing unit 3 in the column n, and the information of the G pixel in the row 2 passes through the second vertical signal line 10 and is held in a sampling capacity of the upper column signal processing unit 3 in the column n+1. Next, brightness information of the R pixel in the row 3 and the G pixel in the row 4 is read. The information of the R pixel in the row 3 passes through the second vertical signal line 10 and is held in a sampling capacity of the lower column signal processing unit 3 in the column n+1, and the information of the G pixel in the row 4 passes through the first vertical signal line 9 and is held in a sampling capacity of the upper column signal processing unit 3 in the column n.

The pixel signals of the entire imaging unit are read by alternately repeating the two operations.

As described above with reference to FIG. 7, the solid-state image capturing device according to the second modification of the Embodiment 1 of the present invention includes two vertical signal lines in each column of the pixel unit, the pixels of the respective colors in each of the columns are distributed between and connected to the two vertical signal lines, and each of the two vertical signal lines is connected to a corresponding one of column signal processing units 3 in different columns, and even when a failure occurs in one of the vertical signal lines or column signal processing units 3, half of the brightness information of the R pixels in each of the columns can be read. It is to be noted that the same advantageous effect can be obtained as to the B pixels and the G pixels.

(Embodiment 2)

The following describes a solid-state image capturing device and a method of driving the same according to Embodiment 2 of the present invention with reference to the drawings.

Figure 8:
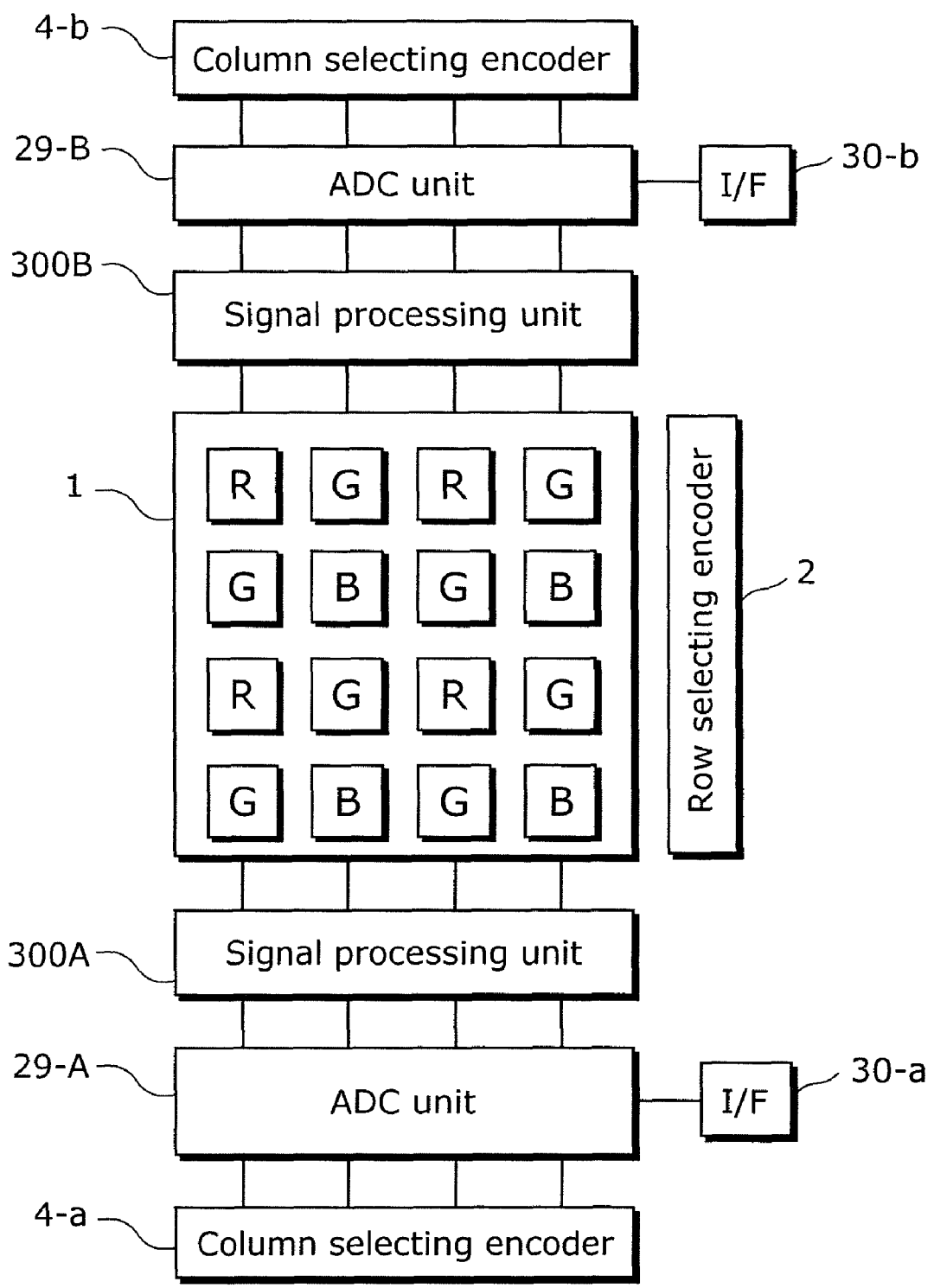
FIG. 8 is a diagram which shows an overall configuration of a solid-state image capturing device according to Embodiment 2 of the present invention.

FIG. 8 is a diagram which shows an overall configuration of the solid-state image capturing device according to Embodiment 2 of the present invention.

The solid-state image capturing device includes: an imaging unit 1; a row selecting encoder 2; two signal processing units 300A and 300B; two ADC units 29-A and 29-B; two column selecting encoders 4-*a* and 4-*b;* and two digital outputs I/Fs 30-*a* and 30-*b*.

The imaging unit 1 is an imaging area in which pixels that perform photoelectric conversion are arranged two-dimensionally. An example of 16 pixels arranged in a 4×4 matrix is shown here, however, a total of at least approximately several million pixels are practically included.

Further, the column row selecting encoder 2 includes three control lines of RDCEL, RSCEL, and TRANS for each horizontal row and controls resetting (initialization), read (reading), and line select (row selecting) on unit cells in the imaging unit 1 on a row-by-row basis.

In addition, the signal processing unit 3, to which the same single column signal processing circuit is connect for each vertical column, processes an output from the imaging unit 1 on a row-by-row basis and holds a result.

Further, the ADC unit 29 includes plural column ADCs each of which is connected to a corresponding one of the vertical columns, digitally converts an output from the signal processing unit 3 on a row-by-row basis, and hold a result.

Further, the column selecting encoder 4 includes a control line and sequentially selects from column ADCs in the ADC units 29.

Further, the digital output I/Fs 30-*a* and 30-*b* receive digital information from the column ADCs, perform conversion necessary for outputting to the outside, and output.

Further, the signal processing units, the ADC units, the column selecting encoders, and the digital output I/Fs are placed one by one both above and below the imaging unit. The signals detected in the imaging unit are distributed between the upper and the lower circuit and read to the outside of the chip.

Figure 9:
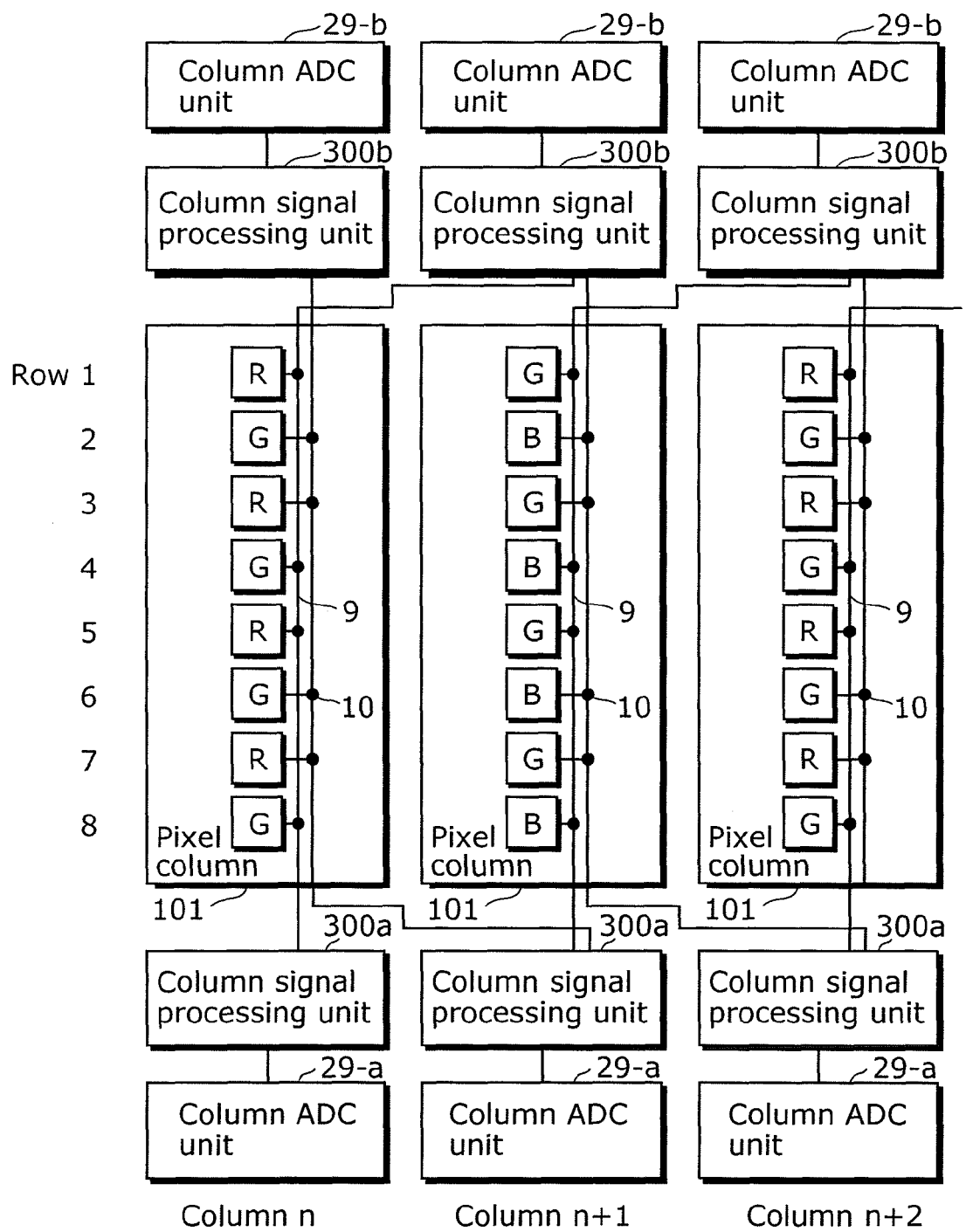
FIG. 9 is a diagram which shows a configuration of three columns of the solid-state image capturing device according to Embodiment 2 of the present invention.

FIG. 9 is a circuit diagram which shows a configuration of three columns of the solid-state image capturing device according to Embodiment 2 of the present invention.

In the same manner as Embodiment 1, two vertical signal lines, that is, the first vertical signal line 9 and the second vertical signal line 10 are placed in each column of the imaging unit, and among the R pixels, the R pixels in the row 1 and the row 5 are connected to the first vertical signal line 9 and the R pixels in the row 3 and the row 7 are connected to the second vertical signal line 10, whereas, among the G pixels, the G pixels in the row 2 and the row 6 are connected to the second vertical signal line 10 and the G pixels in the row 4 and the row 8 are connected to the first vertical signal line 9, as shown in FIG. 9.

Further, the first vertical signal line 9 in the column n is connected to: the column signal processing unit 300a and the column ADC 29-a in the lower side of the column n; and the column signal processing unit 300b and the column ADC 29-b in the upper side of the column n+1, and the second vertical signal line 10 is connected to: the column signal processing unit 300a and the column ADC 29-a in the lower side of the column n+1; and the column signal processing unit 300b and the column ADC 29-b in the upper side of the column n.

Further, brightness information of each pixel in each of the pixel columns 101 is read to the upper and the lower column signal processing units 300a and 300b per two rows and digitally converted and held in the column ADCs 29-a and 29b. The brightness digital information that has been held is sequentially selected in the column selecting encoders 4-a and 4-b and output to the outside of the chip via the digital output I/Fs 30-a and 30-b.

Further, the following describes reading from the imaging unit, focusing on the column n, with reference to FIG. 9.

First, brightness information of R pixels in the row 1 and G pixels in the row 2 is read. The brightness information of the R pixels in the row 1 passes through the first vertical signal line 9 and the lower column signal processing unit 300a in the column n and held in the column ADC 29-a in the column n, and the brightness information of the G pixels in the row 2 passes through the second vertical signal line 10 and the upper column signal processing unit 300b in the column n+1 and held in the column ADC 29-b in the column n+1.

Next, brightness information of the R pixels in the row 3 and the G pixels in the row 4 is read. The brightness information of the R pixels in the row 3 passes through the second vertical signal line 10 and the lower column signal processing unit 300a in the column n+1 and held in the column ADC 29-a in the column n+1, and the brightness information of the G pixels in the row 4 passes through the first vertical signal line 9 and the upper column signal processing unit 300b in the column n and held in the column ADC 29-b in the column n.

The pixel signals of the entire column n are read by alternately repeating the two operations.

As described above with reference to FIG. 8 to FIG. 9, the solid-state image capturing device according to Embodiment 2 of the present invention includes two vertical signal lines in each column of the pixel unit, the pixels of the respective colors in each of the columns are distributed between and connected to the two vertical signal lines, the two vertical signal lines in each column are respectively connected to the column signal processing units 300a and 300b and the column ADC units 29-a and 29-b placed in different columns, and signals of each of the pixels of the respective colors are read via the two vertical signal lines, the column signal processing units 3, and the column ADCs, making it possible to read half of the brightness information of the R pixels in each of the columns even when a failure occurs in one of the vertical signal lines, the column signal processing units 3, or column ADCs. It is to be noted that the same advantageous effect can be obtained as to the B pixels and the G pixels.

It is to be noted that, as a function of AD conversion is added to the output converting circuit when digital output is necessary in Embodiment 1, however, all R pixel information is lost when a failure occurs in the ADC with this configuration. Thus, resistance to a failure is higher in Embodiment 2 in the case where outputting of the solid-state imaging device is digitally performed.

(Embodiment 3)

The following describes a solid-state image capturing device and a method of driving the same according to Embodiment 3 of the present invention with reference to the drawings.

Figure 10:
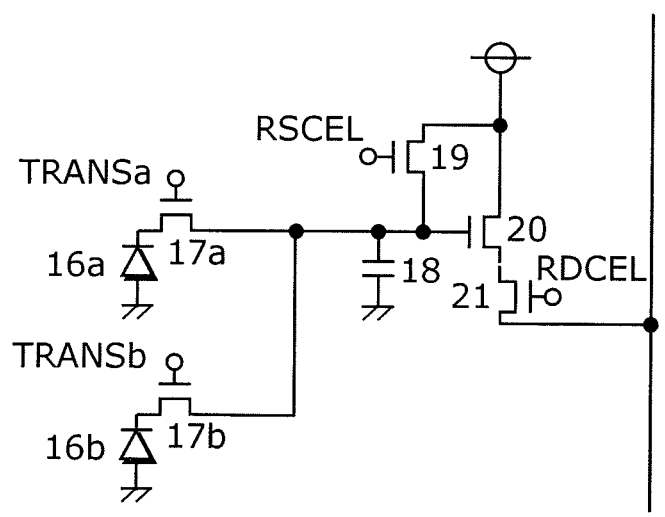
FIG. 10 is a circuit diagram of a pixel circuit according to Embodiment 3 of the present invention.

First, FIG. 10 is a circuit diagram which shows a pixel unit in Embodiment 3 of a solid-state image capturing device according to the present invention.

FIG. 10 shows a configuration having two pixels that are adjacent in the row direction as one basic unit cell, which includes: two photodiodes (PD) which are photoelectric conversion elements, that is, a photodiode 16a and photodiode 16b; two transfer Tr, that is, a transfer Tr 17a and transfer Tr 7b, a capacitor (floating diffusion, FD) 18; a reset Tr 19; am amplifying Tr 20; and a selecting Tr 21. The two PDs respectively perform photoelectric conversion on incident light and accumulation of a generated electric charge, and an accumulated electric charge is output as a voltage signal to the vertical signal line via a common pixel unit reading circuit (the capacitor, the reset Tr, the amplifying Tr, and the selecting Tr).

Figure 11:
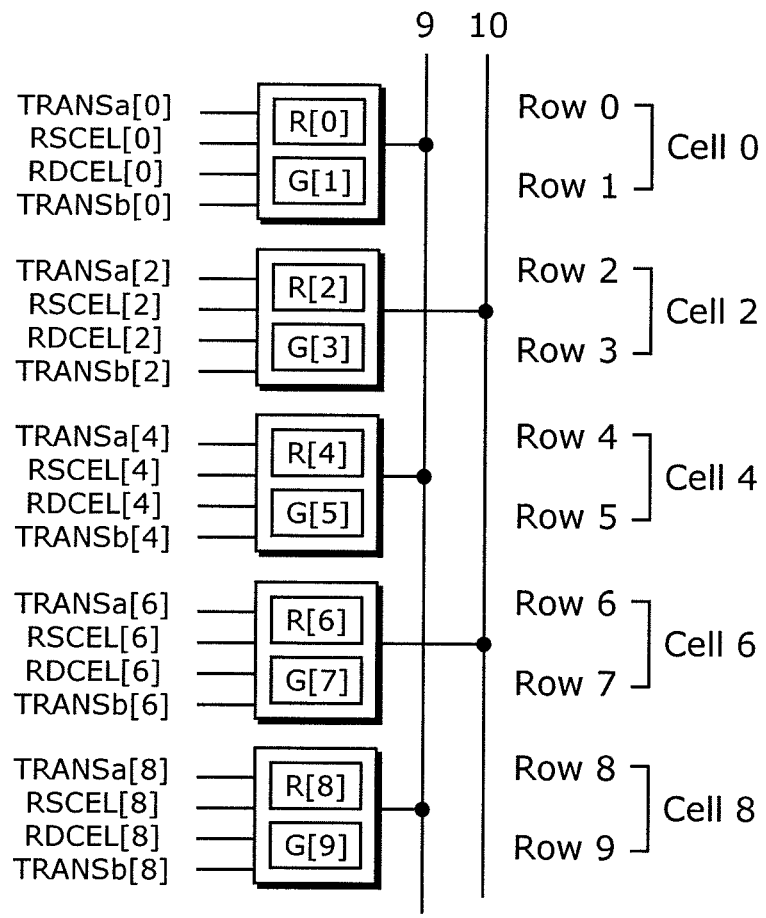
FIG. 11 is a diagram which shows a configuration of an imaging unit according to Embodiment 3 of the present invention.

FIG. 11 shows a configuration of an imaging unit of one column according to Embodiment 3. The basic cells including the two pixels shown in FIG. 10 are vertically aligned and alternately connected to the two vertical signal lines. The diagram shows 10 rows including the row 0 to the row 9 and 5 basic cells including 0, 2, 4, 6, and 8. The overall configuration of the solid-state imaging device according to Embodiment 3 is the same as that in FIG. 1 and the configuration of one column is the same as that in FIG. 2 in which the imaging unit is replaced with that in FIG. 11.

Here, a reset pulse (initialization signal: RSCEL), two read pulses (reading pulse: TRANSa, TRANSb), and a line select pulse (row selecting signal: RSCEL) are supplied to the basic cells in the pixel unit and the same pulse as in Embodiment 1 is supplied to the column signal processing unit 3, with a predetermined timing, thereby opening and closing (on and off) the transistor corresponding to each of the control pulses.

Figure 12A:
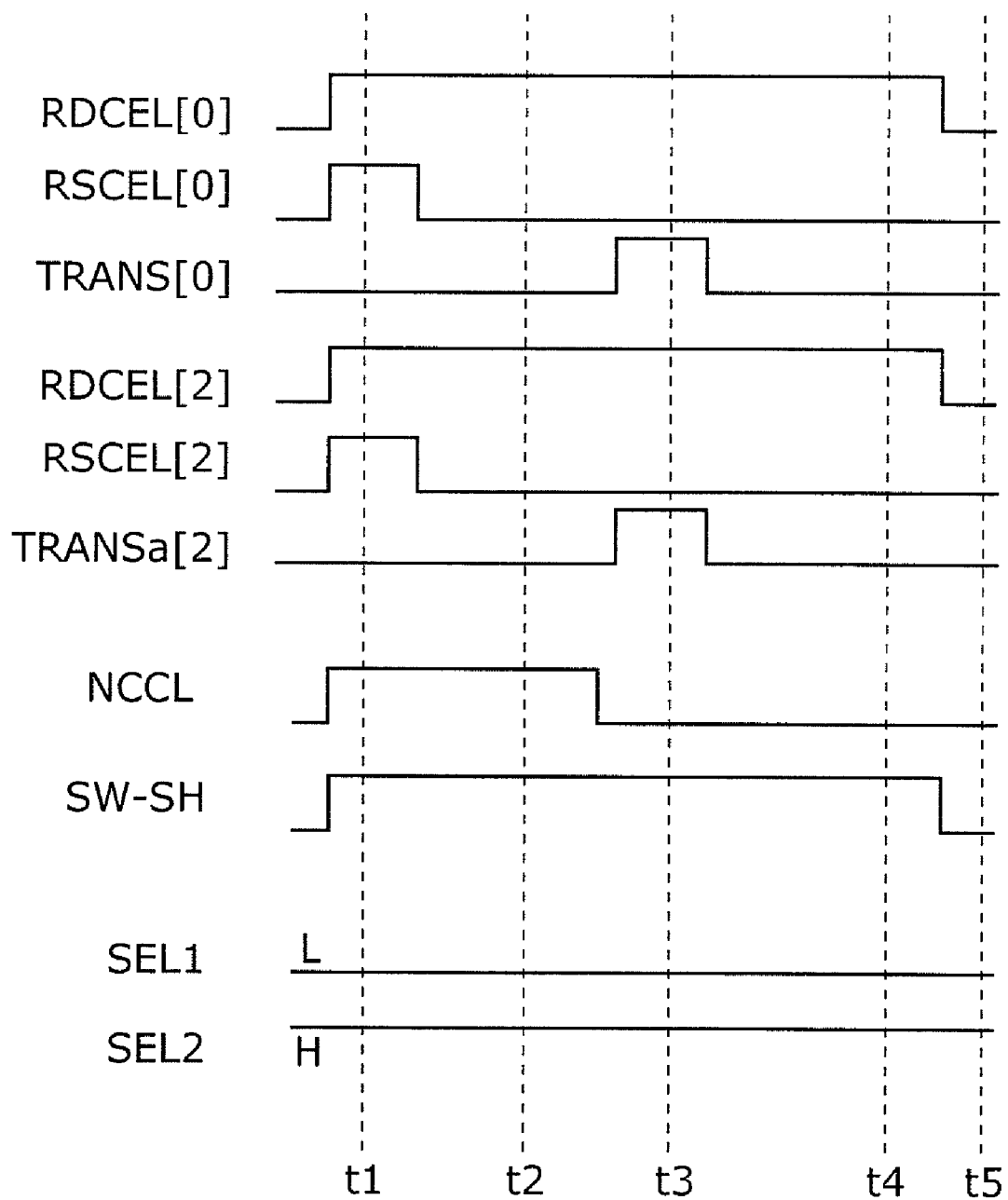
FIG. 12A is a diagram which shows a timing of each control pulse of the solid-state image capturing device according to Embodiment 3 of the present invention.
Figure 12B:
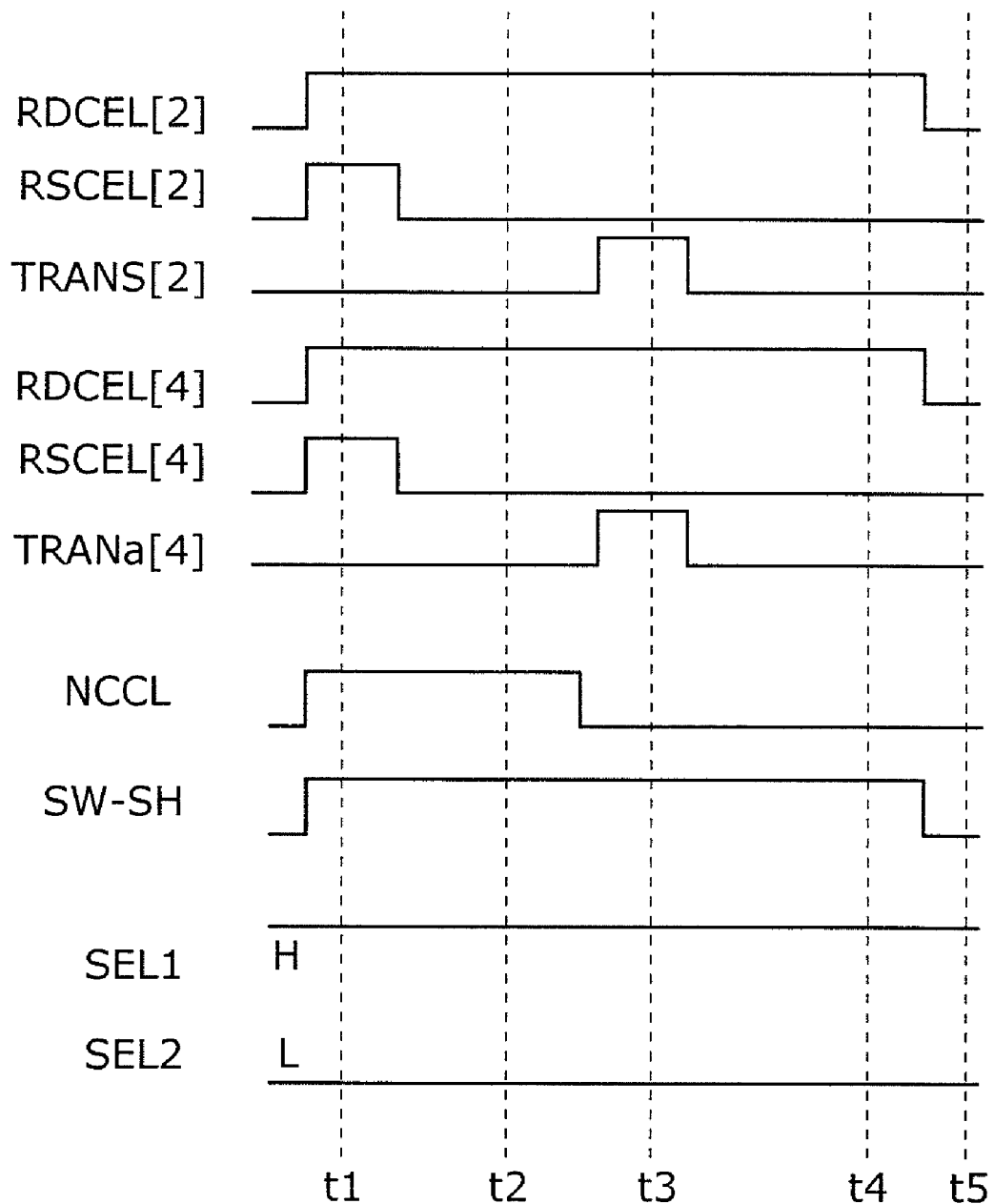
FIG. 12B is a diagram which shows a timing of each control pulse of the solid-state image capturing device according to Embodiment 3 of the present invention.

The following describes a method of driving the solid-state image capturing device according to Embodiment □ of the present invention with reference to FIG. 12A and FIG. 12B.

In FIG. 12A, RDCEL[0] and RDCEL[2] are pulse voltages for connecting a pixel output of a cell 0 and cell 2 to the vertical signal lines, RSCEL[0] and RSCEL[2] are pulse voltages for performing reset operation of the capacitor to an initial voltage in the cell 0 and cell 2, TRANSb[0] is a pulse voltage for performing a transfer operation of electric charges accumulated in the PD on the b side in the cell 0, that is, the PD of G[1] pixel, TRANSa[2] is a pulse voltage for performing a transfer operation of electric charges accumulated in the PD on the a side in the cell 2, that is, the PD of R[2] pixel, the NCCL is a pulse voltage for setting, to a clamp potential VCL, a terminal potential opposite to the column amplifier of the clamp capacity, the SW-SH is a pulse voltage for writing a signal to the sampling capacity, the SEL 1 is a voltage for performing a connection operation of the first vertical signal line to the lower column signal processing unit 3, and the SEL 2 is a voltage for performing a connection operation of the second vertical signal line to the lower column signal processing unit 3.

In FIG. 12B, RDCEL[2] and RDCEL[4] are pulse voltages for connecting a pixel output of a cell 2 and cell 4 to the vertical signal lines, RSCEL[2] and RSCEL[4] are pulse voltages for performing reset operation of the capacitor to an initial voltage in the cell 2 and cell 4, TRANSb[2] is a pulse voltage for performing a transfer operation of electric charges accumulated in the PD on the b side in the cell 2, that is, the PD of G[3] pixel, TRANSa[4] is a pulse voltage for performing a transfer operation of electric charges accumulated in the PD on the a side in the cell 4, that is, the PD of R[4] pixel.

FIG. 12A is a diagram which shows a timing of each control pulse supplied at the timing of reading the row 1 and the row 2. Since the SEL 1 is L and the SEL 2 is H, a signal of the G[1] pixel in the row 1 is read via the first vertical signal line 9 and the upper column signal processing unit 3, and a signal of the R[2] pixel in the row 2 is read via the second vertical signal line 10 and the lower column signal processing unit 3. An operation of the circuit at each timing is the same as Embodiment 1.

Next, FIG. 12B is a diagram which shows a timing of each control pulse supplied at the timing of reading the row 3 and the row 4. Since the SEL 1 is L and the SEL 2 is H, a signal of the G[3] pixel in the row 3 is read via the second vertical signal line 10 and the upper column signal processing unit 3, and a signal of the R[4] pixel in the row 4 is read via the first vertical signal line 9 and the lower column signal processing unit 3.

Figures 13, 14:
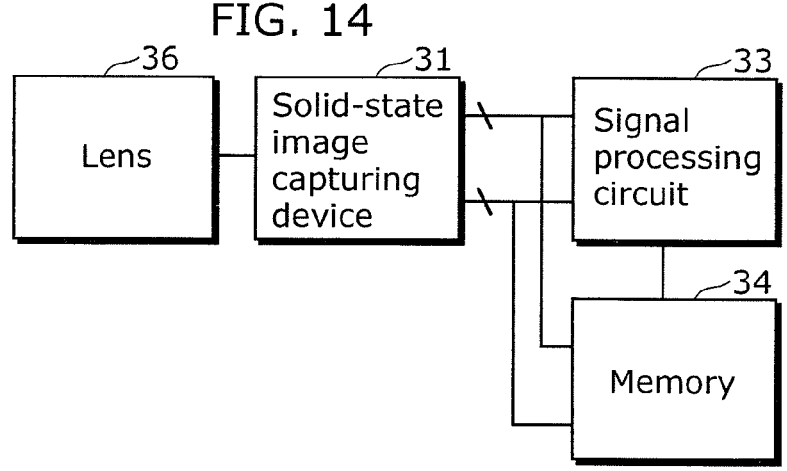
FIG. 13 is a diagram which shows a control of the solid-state image capturing device according to Embodiment 3 of the present invention.
FIG. 14 is a diagram which shows an overall configuration of an image capturing device according to Embodiment 4 of the present invention.

FIG. 13 shows to which pixel control lines pulses are input in reading of the row 1 to row 4. The vertical axis show control lines and the horizontal axis shows an operation sequence of which a period of reading pixel signals for two rows are a unit and P in the diagram indicates that a pulse is input during a corresponding period. In addition, the pixels read by each vertical signal are described in two rows from the bottom in the diagram. 1H in FIG. 13 corresponds to FIG. 12A and 2H corresponds to FIG. 12B. Brightness information of all of the pixels can be read by repeating the same operation after 3H as well (the row 0 is an invalid row in which reading is not necessary).

The above description explained with reference to FIG. 10 to FIG. 13 is summarized as follows: in the solid-state image capturing device according to Embodiment 3 of the present invention, the pixel unit are included in which two pixels share the pixel reading unit; two vertical signal lines are included in each column of the pixel unit; the basic cells each having two pixels in each column are distributed between and connected to the two vertical signal lines; and signals of a part of the basic cells in each column are read via one of the vertical signal line and the remaining basic cell signals are read via the other vertical signal line, thereby making it possible, even when a failure occurs in one of the vertical signal lines, to read the signal of the basic cell connected to the other vertical signal line. Thus, it is possible to prevent the problem of losing all of the signals of one of the colors in one column when a failure occurs in the signal line even when using the Bayer array that is a general arrangement pattern of color filters.

Further, in the solid-state image capturing device according to Embodiment 3 of the present invention, since two pixels share the pixel reading unit, the number of transistors for each pixel decreases from 4 to 2.5, and there also is an advantage that an aperture ratio of pixels, in other words, sensitivity is improved.

It is to be noted that both of the solid-state image capturing device including the output converting unit (AD converter) described in Embodiment 1 and the solid-state image capturing device including the column AD unit described in Embodiment 2 can be used in the embodiments according to the present invention.

It is to be noted that two pixels share the reading unit in the above description, however, more pixels, such as 3 pixels or 4 pixels, may share the reading unit. Further, pixels which are shared by the reading unit may span plural columns.

(Embodiment 4)

FIG. 14 is a diagram which shows an overall configuration of an imaging device according to Embodiment 4 of the present invention. A lens 36 which irradiates an optical image on an imaging unit in a solid-state image capturing device, a solid-state image capturing device 31 which detects the irradiated optical image and outputs the brightness information as a digital value in two lines, a signal processing circuit 33 which receives an output from a sensor and performs signal processing, and a nonvolatile memory 34 (a flush memory, for example) which stores information necessary for the signal processing are included. The solid-state image capturing device 31 may be any of the solid-state image capturing devices described in Embodiments 1, 2, and 3.

Figures 15A, 15B, 15C:
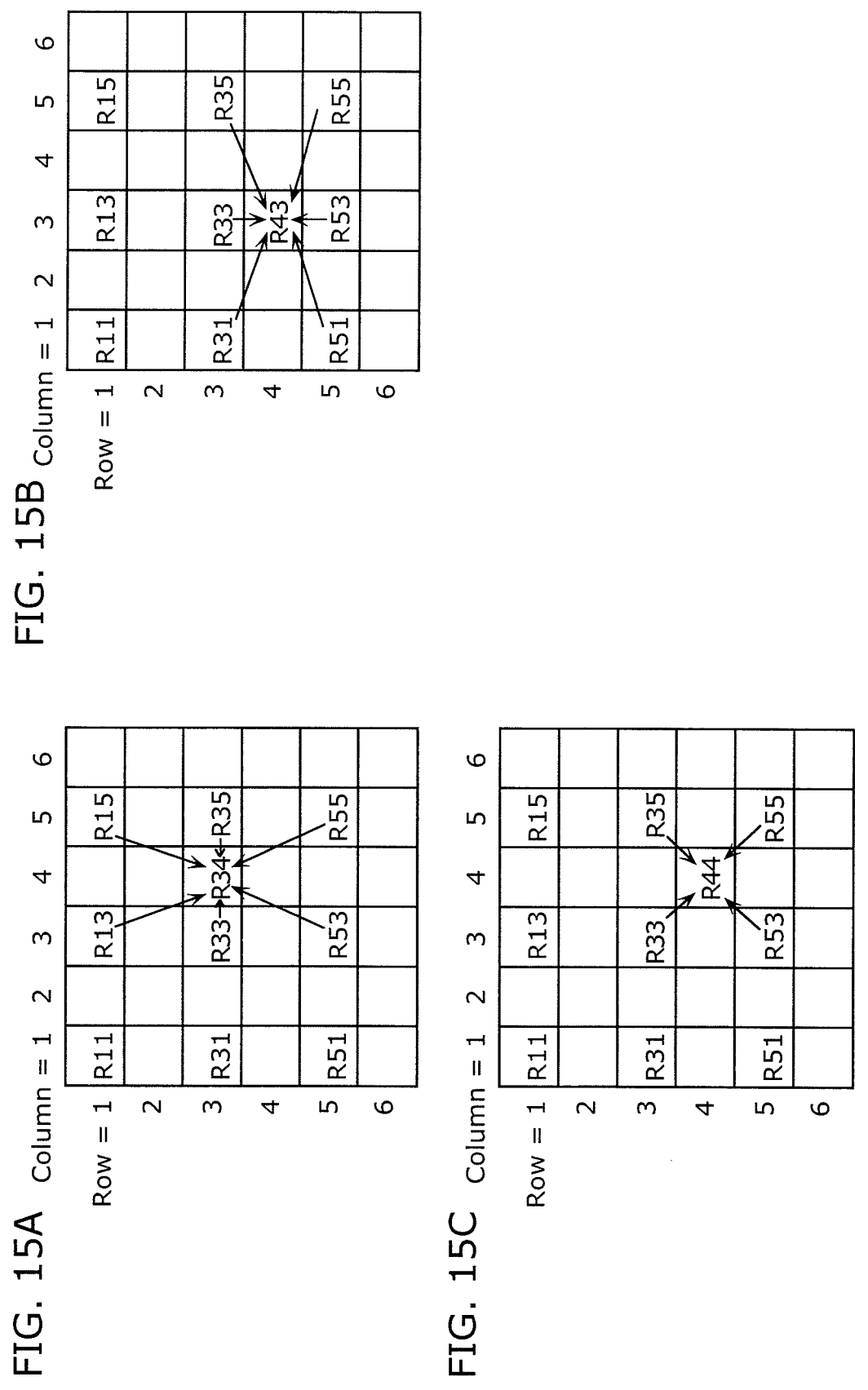

Since color filters in the solid-state image capturing device are arranged in a Bayer array, each pixel has only one color information among RGB. The signal processing circuit 33 performs interpolation by using information of surrounding pixels and calculates other color information in order to obtain an image having all color information. The following describes interpolation on information regarding R, based on FIG. 15A, FIG. 15B, and FIG. 15C. In the imaging device, an R signal is detected in only one of four pixels. When focusing on the four pixels indicated by (row 3, column 3), (row 4, column 3), (row 3, column 4) and (row 4, column 4), the R signal is included only in the pixel indicated by (row 3, column 3). The R signal of the pixel in the intersection of the row 3 and the column 4 is calculated from an average of the R signals of surrounding six pixels as shown in FIG. 15A. The above applies also to other two pixels in which an R signal is not included (FIG. 15B and FIG. 15C). It is possible to obtain a color image including all color information by also performing interpolation for G and B in the same manner.

The following considers a case where a failure occurs in one of the vertical signal lines in the imaging unit of the solid-state image capturing device. In the case where the column includes an R pixel, R information can be obtained only in every other row as to the column. The following describes an interpolation processing for this case. The case is considered where R information of the pixel indicated by (row 3, column 3) cannot be obtained due to a failure.

The position of the failure is obtained in advance through estimation or the like, and stored in the nonvolatile memory 34. In the case where information of the pixel indicated by (row 3, column 3) is not used in the interpolation processing, the same processing as in FIG. 15A, FIG. 15B, and FIG. 15C is carried out.

Figures 16A, 16B, 16C, 16D:
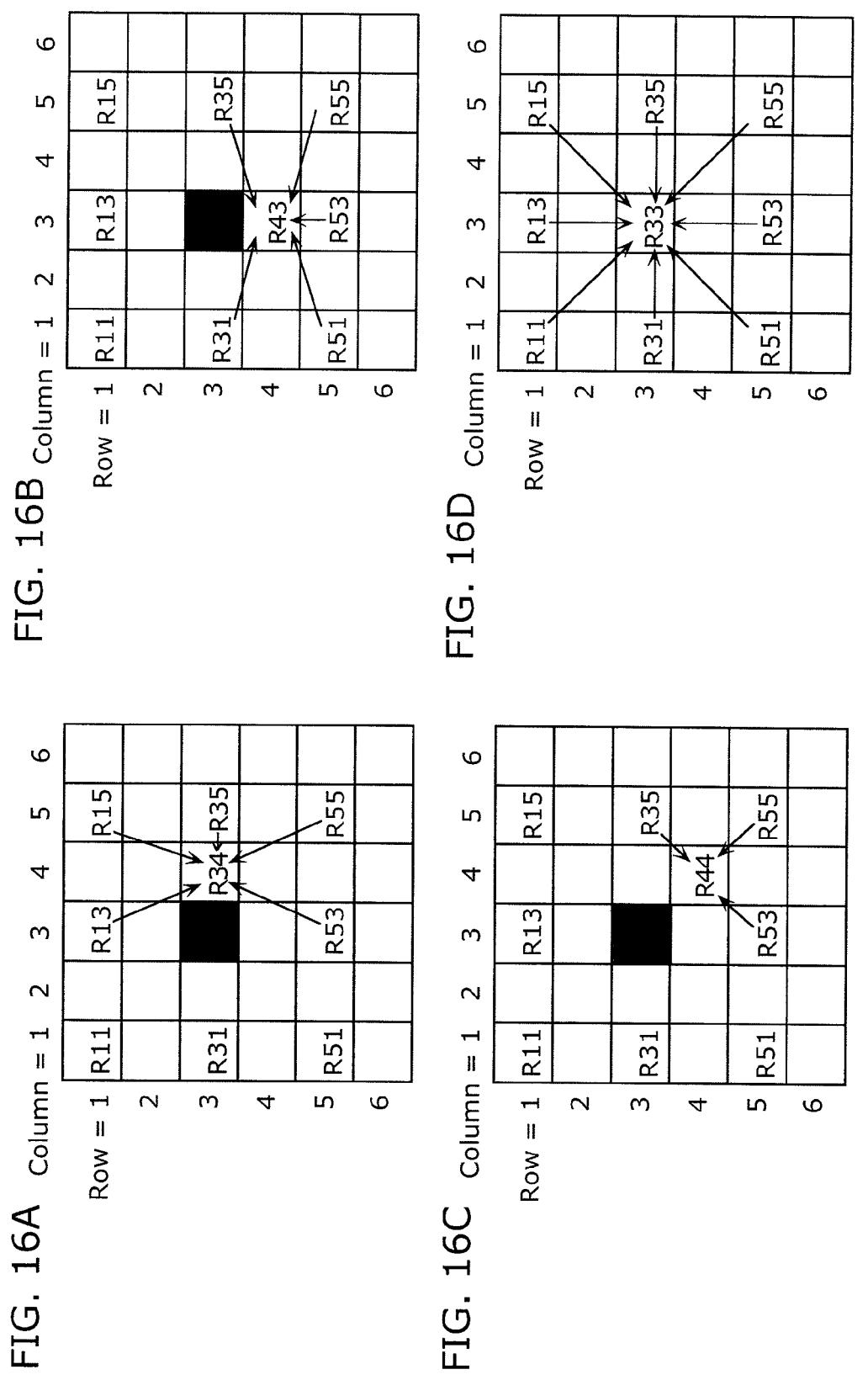

On the other hand, in the case where information of the pixel indicated by (row 3, column 3) is necessary, as to the pixel indicated by (row 3, column 4), (row 4, column 3), and (row 4, column 4), an average is obtained by reducing, by one, the number of the surrounding pixels to be referred to, as shown in FIG. 16A, FIG. 16B, and FIG. 16C.

Further, as to the pixel indicated by (row 3, column 3), correction is carried out by using 8 surrounding pixels as shown in FIG. 16D. First, a gradient of brightness in the vertical direction (V) and the horizontal direction (H) is calculated. More specifically, the following calculations are performed: Gv1=abs(ave(R11, R13, R15)−ave(R31, R35)), Gv2=abs(ave(R51, R53, R55)−ave(R31, R35)), Gh1=abs(ave(R11, R31, R51)−ave(R13, R53)), and Gh2=abs(ave(R15, R35, R55)−ave(R13, R53)). Here, the abs represents an absolute value and the ave represents an average.

Next, a maximum value of Gv1, Gv2, Gh1, and Gh2 is detected. Since the edge of a pattern is considered to be in the horizontal direction in the case where the maximum value is Gv1 or Gv2, the average value in the horizontal direction, that is, the average value of R31 and R35 is determined to be the correction value of the pixel indicated by (row 3, column 3). On the other hand, since the edge of a pattern is considered to be in the vertical direction in the case where the maximum value is Gh1 or Gh2, the average value in the vertical direction, that is, the average value of R13 and R53 is determined to be the correction value of the pixel in the intersection of the row 3 and the column 3. Which interpolation processing is performed, or whether or not the defect correction processing is performed, is controlled based on the position information stored in the nonvolatile memory 34. With the above-described processing, it is possible to obtain a color image including all color information.

Figure 17B:
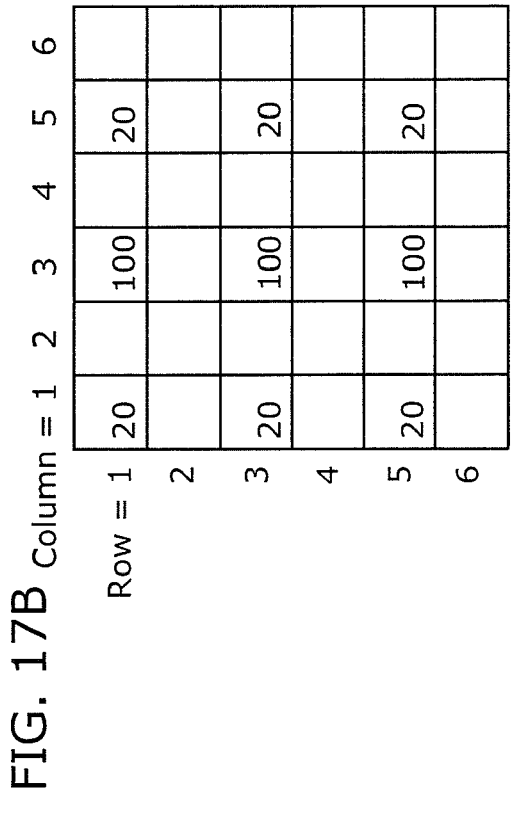
FIG. 17B is a diagram which shows a problem of correction processing in a conventional image capturing device.
Figure 17D:
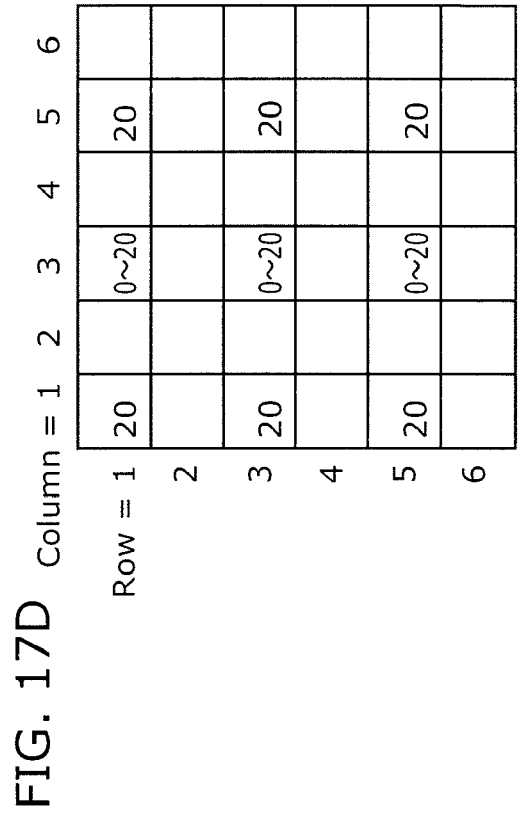
FIG. 17D is a diagram which shows a problem of correction processing in a conventional image capturing device.
Figure 17A:
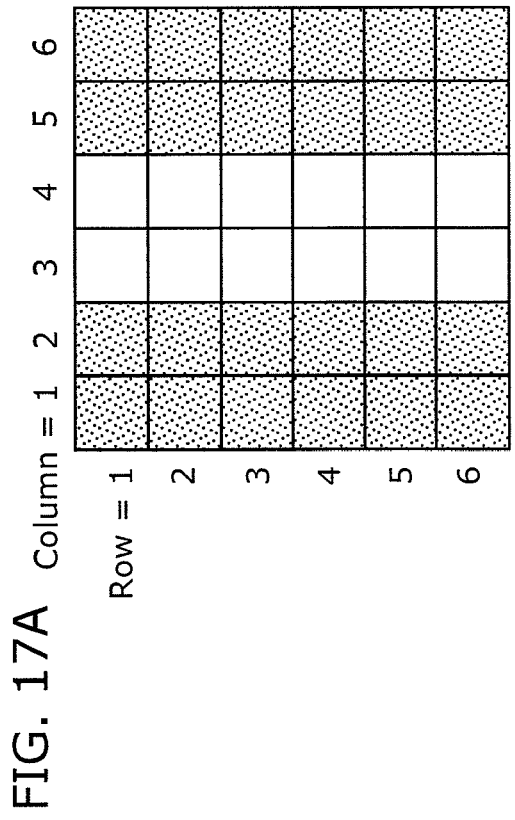
FIG. 17A is a diagram which shows a problem of correction processing in a conventional image capturing device.

The following describes a difference in correcting a defect between the case of an imaging device having a conventional configuration and an imaging device having a configuration according to an implementation of the present invention. The following describes the case of the conventional configuration with reference to FIG. 17A, FIG. 17B, FIG. 17C, and FIG. 17D. The case is considered where a vertically-striped pattern is input as shown in FIG. 17A. FIG. 17B shows brightness information of each of the R pixels in the case where there is no failure in the solid-state image capturing device.

Figure 17C:
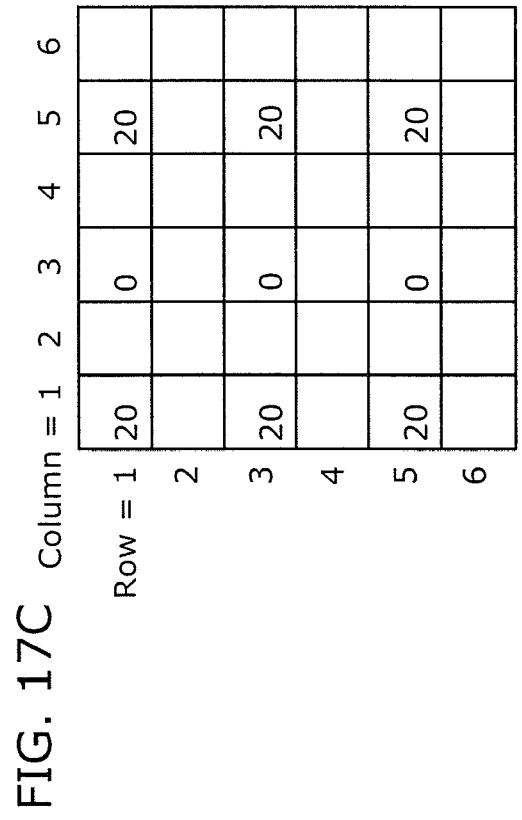
FIG. 17C is a diagram which shows a problem of correction processing in a conventional image capturing device.

Brightness information is represented by numbers from 0 to 255, indicating the greater brightness (whiter, in an image) with the larger number. On the other hand, FIG. 17C shows the brightness information of each of the R pixels output from the solid-state image capturing device in the case where a failure occurs in the vertical signal line of the column 3 in the solid-state image capturing device. All the brightness information of the three R pixels in the column 3 indicates 0. FIG. 17D shows brightness information after correcting the defect. Correction of a defect pixel is, in general, processing of replacing the defect pixel with an average of all or part of the surrounding pixels, and the brightness value of the pixels in the column 3 ranges from 0 to 20. An error between the correction value and a correct value 100 becomes significantly large, and thus obtaining the R information of the pixels in the column 3 by using the signal of surrounding pixels is difficult when the conventional configuration is used in the imaging apparatus.

On the other hand, FIG. 18A, FIG. 18B, FIG. 18C, and FIG. 18D show the case where the image capturing device has the configuration according to an implementation of the present invention. The case is considered where an input pattern is the vertically-striped pattern in the same manner, as shown in FIG. 18A. The following describes the case where a failure occurs in one of the vertical signal lines in the column 3 of the solid-state image capturing device. Brightness information of half of the R pixels in the column 3 is obtained even in this case. More specifically, the case is considered where an incorrect value that is 0 is output to R33 and a correct value is output to R13 and R53 as shown in FIG. 18C. In order to perform correction on the pixel indicated by (row 3, column 3), four items of information of the gradient of brightness are first obtained as follows: GV1=33; Gv2=33; Gh1=80; and Gh2=80. Since the maximum gradient is Gh1 and Gh2, it can be assumed that the edge of a pattern is in the vertical direction, and the average value 100 is the correction value of R13 and R53. The error between the correction value and a correct value is small, which means that R information of the pixel indicated by (row 3, column 3) can be obtained as well in the case where the configuration according to an implementation of the present invention is used.

The above description explained with reference to FIG. 14 to FIG. 18D is summarized as follows: in the image capturing device according to Embodiment 4 of the present invention, two vertical signal lines are included in each column of the pixel unit in the image capturing device; pixels of the respective colors in each of the columns are distributed between and connected to the two vertical signal lines; the nonvolatile memory that holds the position of a failure in the vertical signal lines in the pixel unit in the image capturing device and the signal processing circuit for the solid-state image capturing device are included; a part of the signals of the pixels of the respective colors in each of the columns are read via one of the vertical signal lines and the remaining signals are read via the other vertical signal line; and information lost due to a failure is corrected by using signals obtained in surrounding columns or the same column, thereby making it possible, even when a failure occurs in one of the signal lines of the imaging unit in the solid-state image capturing device, to obtain a color image that includes all color information.

In addition, the present embodiment shows the case of signal processing algorithm that performs interpolation in the Bayer array and defect correction simultaneously, however, the same advantageous effect can be obtained also in another embodiment in which a different signal processing algorithm is applied (interpolation in the Bayer array and defect correction are carried out by different signal processing units connected in series, for example), by including: the solid-state imaging device having the configuration shown in Embodiment 1 or Embodiment 3; and correction of a pixel lacking information in a later stage with use of information that can be detected in the column where a failure occurs.

(Embodiment 5)

Figure 19:
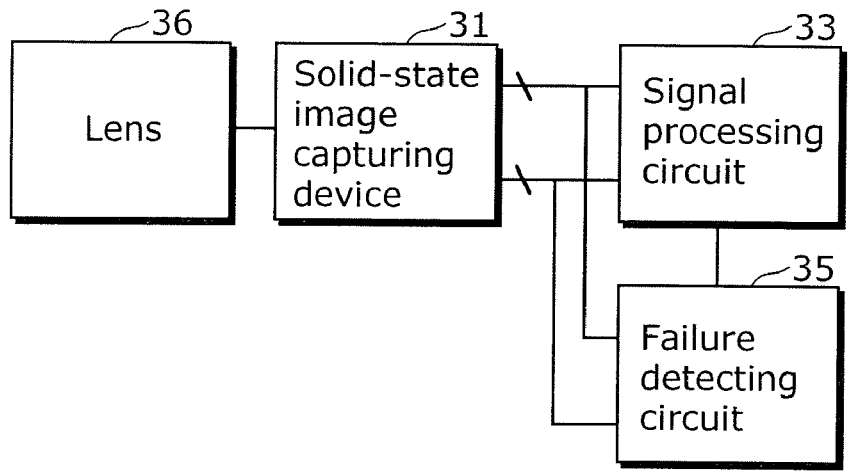
FIG. 19 is a diagram which shows an overall configuration of an image capturing device according to Embodiment 5 of the present invention.

FIG. 19 is a diagram which shows an overall configuration of an image capturing device according to Embodiment 5 of the present invention. A camera is shown which is mounted on a vehicle and performs perimeter monitoring. A lens 36 which irradiates an optical image on an imaging unit in a solid-state image capturing device, a solid-state image capturing device 31 which detects the irradiated optical image and outputs the brightness information as a digital value in two lines, a failure detecting circuit 35 that receives digital brightness information from the solid-state image capturing device and detects a column and area in which a defect exists, and a signal processing circuit 33 that receives the digital brightness information from the solid-state image capturing device and defect position information from the failure detecting circuit and performs signal processing, are included. The solid-state image capturing device 31 has the configuration shown in Embodiments 1, 2, or 3.

Figure 20:
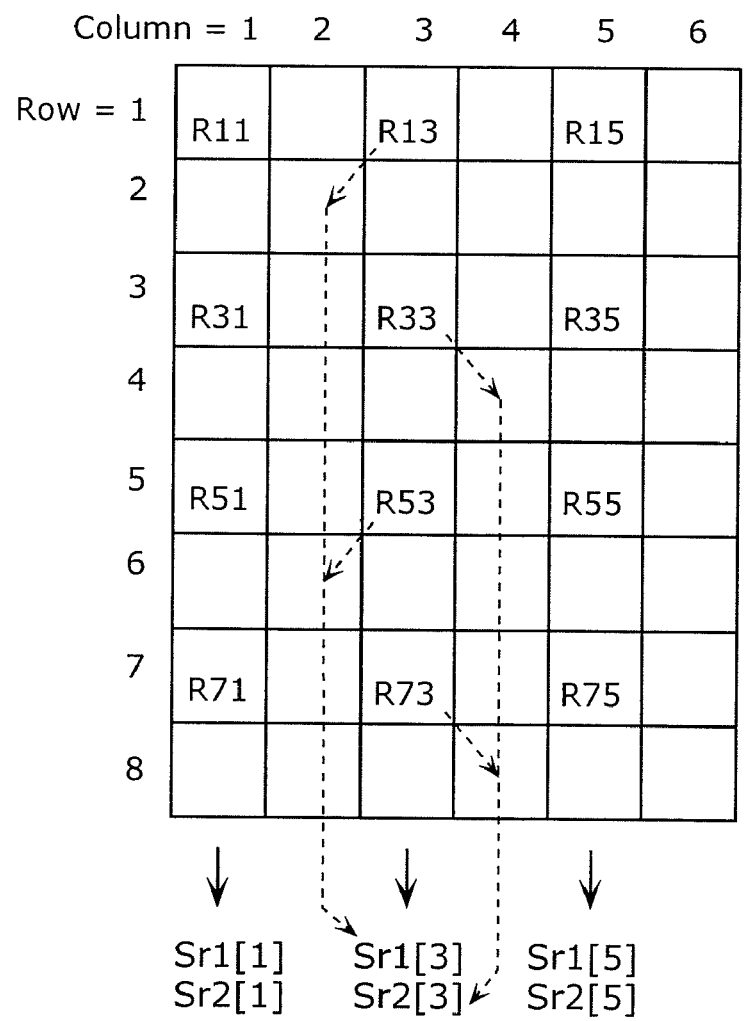
FIG. 20 is a diagram which shows defect detecting processing of the image capturing device according to Embodiment 5 of the present invention.

The following describes an operation of detecting a defect with reference to FIG. 20. Two of R pixel column average values per column, that is, Sr1[n] and Sr2[n] are detected in a certain period of time. Sr1[n] indicates the average value of the R pixels in the rows 1, 5, 9, . . . , and Sr2[n] indicates the average value of the R pixels in the rows 3, 7, 11, . . . . An incident light image, in general, changes as time passes, and thus Sr1[n] and Sr2[n] also change accordingly. Conversely, small temporal change of Sr1[n] and Sr2[n] means that a failure occurs in a column n.

The failure position information that has been detected is transmitted to the signal processing circuit, and interpolation processing and defect correction in the Bayer array when a defect exists is performed in the same manner as Embodiment 4.

As described above, since the image capturing device according to an implementation of the present invention is configured as above, it is possible to obtain an image having all color information even when a failure occurs in one of the signal lines in the solid-state image capturing device, thereby producing an advantageous effect of improved reliability of the camera.

As described above with reference to FIG. 19 and FIG. 20, the image capturing device according to Embodiment 5 of the present invention includes two vertical signal lines in each column of the pixel unit of the image capturing device, the pixels of the respective colors in each of the columns are distributed between and connected to the two vertical signal lines, and a circuit that detects a failure position in the vertical signal lines of the pixel unit in the image capturing device and a signal processing circuit for output of the solid-state image capturing device are included, thereby making it possible to obtain a color image having all color information and to improve the reliability of the camera even when a failure occurs in one of the signal lines of the solid-state image capturing device.

INDUSTRIAL APPLICABILITY

A solid-state image capturing device according to the present invention has a high manufacturability and high resistance against a failure when actually used, and thus is useful as an image sensor for imaging devices that require a large imaging area and the large number of pixels such as a digital single-lens reflex camera, or an image sensor applied to a field in which high reliability is required such as for on-vehicle, for monitoring, or a robot.

The invention claimed is:

1. A solid-state image capturing device comprising:
pixel units which are arranged in rows and columns, each of which is configured to output a pixel signal corresponding to an amount of received light; and
vertical signal lines provided in each of the columns of said pixel units and configured to transmit the pixel signals,
wherein said pixel units in each of the columns are connected to said vertical signal lines such that the pixel signals of a same color are distributed among said vertical signal lines,
said vertical signal lines include a first vertical signal line and a second vertical signal line,
each of said pixel units includes:
photoelectric conversion elements which include at least a first photoelectric conversion element and a second photoelectric conversion element;
a first color filter which filters incident light of a corresponding color entering said first photoelectric conversion element;
a second color filter which corresponds to a color different from said first color filter and which filters incident light of the corresponding color entering said second photoelectric conversion element;
a reader configured to select one of said photoelectric conversion elements and read a signal from the selected one of said photoelectric conversion elements; and
an outputter configured to output the signal read by said reader to one of said first vertical signal line and said second vertical signal line.

2. The solid-state image capturing device according to claim 1,
wherein the pixel signals of the same color in each of the columns are evenly distributed among the vertical signal lines.

3. The solid-state image capturing device according to claim 1,
wherein said pixel units of the same color belonging to each of the columns of said pixel units are distributed between and connected to said first vertical signal line and said second vertical signal line.

4. The solid-state image capturing device according to claim 1,
wherein said pixel units belonging to each of the columns of said pixel units are alternately connected to said first vertical signal line and said second vertical signal line.

5. The solid-state image capturing device according to claim 1,
wherein said outputter includes an amplifying transistor that amplifies a signal from said photoelectric conversion elements and outputs the signal, and
each of said first column signal processor and said second column signal processor includes a current source which supplies a current to one of said amplifying transistors in said pixel units belonging to a corresponding column of said pixel units.

6. A camera comprising the solid-state image capturing device according to claim 1.

7. The solid-state image capturing device according to claim 1,
wherein said pixel units of the same color belonging to each of the columns of said pixel units are alternately connected to said first vertical signal line and said second vertical signal line.

8. A solid-state image capturing device comprising:
pixel units which are arranged in rows and columns, each of which is configured to output a pixel signal corresponding to an amount of received light; and
vertical signal lines provided in each of the columns of said pixel units and configured to transmit the pixel signal,
wherein said pixel units in each of the columns are connected to said vertical signal lines such that the pixel signals of a same color are distributed among said vertical signal lines,
said vertical signal lines include a first vertical signal line and a second vertical signal line,
said pixel units of different colors are alternately connected to said first vertical signal line, and
said pixel units of different colors are alternately connected to said second vertical signal line.

9. A solid-state image capturing device comprising:
pixel units which are arranged in rows and columns, each of which is configured to output a pixel signal corresponding to an amount of received light; and
vertical signal lines provided in each of the columns of said pixel units and configured to transmit the pixel signals,
wherein said pixel units in each of the columns are connected to said vertical signal lines such that the pixel signals of a same color are distributed among said vertical signal lines,
said vertical signal lines include a first vertical signal line and a second vertical signal line, and
said pixel units of the same color belonging to each of the columns of said pixel units are distributed between and connected to said first vertical signal line and said second vertical signal line,
the solid-state image capturing device further comprising:
a first column signal processor provided per column of said pixel units and configured to cancel a noise component from a pixel signal that is output from one of said pixel units via one of said first vertical signal line and said second vertical signal line; and
a second column signal processor provided per column of said pixel units and configured to cancel a noise component from a pixel signal that is output from one of said pixel units via the other one of said first vertical signal line and said second vertical signal line.

10. The solid-state image capturing device according to claim 9,
wherein each of said first column signal processor and said second column signal processor includes:
a selector which selects one of the pixel signal from said first vertical signal line and the pixel signal from said second vertical signal line; and
a canceling circuit which cancels a noise component from the pixel signal selected by said selector, and
said first vertical signal line and said second vertical signal line, which are connected to said selector, correspond to a same column of said pixel units.

11. The solid-state image capturing device according to claim 9,
wherein each of said first column signal processor and said second column signal processor includes:
a selector which selects one of the pixel signal from said first vertical signal line and the pixel signal from said second vertical signal line; and
a canceling circuit which cancels a noise component from the pixel signal selected by said selector,
one of said first vertical signal line and said second vertical signal line, which are connected to said selector, corresponds to a column of said pixel units corresponding to said selector, and
the other one of said first vertical signal line and said second vertical signal line, which are connected to said selector, corresponds to a column of said pixel units adjacent to the column of said pixel units corresponding to said selector.

12. The solid-state image capturing device according to claim 9,
wherein said first column signal processor is connected to one end of at least one of said first vertical signal line and said second vertical signal line, and
said second column signal processor is connected to the other end of at least the other one of said first vertical signal line and said second vertical signal line.

13. A solid-state image capturing device comprising:
pixel units which are arranged in rows and columns, each of which is configured to output a pixel signal corresponding to an amount of received light; and
vertical signal lines provided in each of the columns of said pixel units and configured to transmit the pixel signals,
wherein said pixel units in each of the columns are connected to said vertical signal lines such that the pixel signals of a same color are distributed among said vertical signal lines,
the solid-state image capturing device further comprising:
a storage configured to store a position of a defective pixel unit; and
an interpolator configured to interpolate pixel data of said defective pixel unit by using pixel data of pixel units surrounding said defective pixel unit.

14. The solid-state image capturing device according to claim 13, further comprising
a detector configured to detect said defective pixel unit and store, in said storage, the position of said defective pixel unit that has been detected.

15. The solid-state image capturing device according to claim 14,
wherein said detector is configured to identify a column in which said defective pixel unit is present by using pixel data obtained from a first vertical signal line and a second vertical signal line of the vertical signal lines.

16. A solid-state image capturing device comprising:
pixel units which are arranged in rows and columns, each of which is configured to output a pixel signal corresponding to an amount of received light; and
vertical signal lines provided in each of the columns of said pixel units and configured to transmit the pixel signals,
wherein said pixel units in each of the columns are connected to said vertical signal lines such that the pixel signals of a same color are distributed among said vertical signal lines,
said vertical signal lines include a first vertical signal line and a second vertical signal line, and
said pixel units of the same color belonging to each of the columns of said pixel units are alternately connected to said first vertical signal line and said second vertical signal line,
the solid-state image capturing device further comprising:
a first column signal processor provided per column of said pixel units and configured to cancel a noise component from a pixel signal that is output from one of said pixel units via one of said first vertical signal line and said second vertical signal line; and
a second column signal processor provided per column of said pixel units and configured to cancel a noise component from a pixel signal that is output from one of said pixel units via the other one of said first vertical signal line and said second vertical signal line.

17. The solid-state image capturing device according to claim 16,
wherein each of said first column signal processor and said second column signal processor includes:
a selector which selects one of the pixel signal from said first vertical signal line and the pixel signal from said second vertical signal line; and
a canceling circuit which cancels a noise component from the pixel signal selected by said selector, and
said first vertical signal line and said second vertical signal line, which are connected to said selector, correspond to a same column of said pixel units.

* * * * *